(12) United States Patent
Breed

(10) Patent No.: US 6,746,078 B2
(45) Date of Patent: Jun. 8, 2004

(54) SYSTEM AND METHOD FOR MOVING A HEADREST BASED ON ANTICIPATORY SENSING

(75) Inventor: David S. Breed, Boonton Township, Morris County, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

(21) Appl. No.: 10/234,063

(22) Filed: Sep. 3, 2002

(65) Prior Publication Data

US 2003/0015898 A1 Jan. 23, 2003

Related U.S. Application Data

(63) Continuation-in-part of application No. 09/613,925, filed on Jul. 11, 2000, which is a continuation-in-part of application No. 08/992,525, filed on Dec. 17, 1997, now Pat. No. 6,088,640.

(51) Int. Cl.[7] .................................................. B60N 2/42
(52) U.S. Cl. ............................ 297/216.12; 297/216.1; 297/216.13
(58) Field of Search ...................... 297/216.12, 216.1, 297/408, 410; 701/45

(56) References Cited

U.S. PATENT DOCUMENTS

| | | | |
|---|---|---|---|
| 3,275,975 A | 9/1966 | King | 180/272 |
| 3,680,912 A | 8/1972 | Matsuura | 297/216.12 X |
| 3,838,870 A | 10/1974 | Hug | 297/384 |
| 4,519,652 A | 5/1985 | Kamijo | 180/268 |
| 4,645,233 A | 2/1987 | Bruse et al. | 297/410 |
| 4,797,824 A | 1/1989 | Sugiyama et al. | 364/424.05 |
| 4,811,226 A | 3/1989 | Shinohara | 364/424.05 |
| 4,853,687 A | 8/1989 | Isomura et al. | 364/424.05 |
| 4,865,388 A | 9/1989 | Nemoto | 297/403 |
| 4,935,680 A | 6/1990 | Sugiyama | 364/424.05 |
| 4,995,639 A | 2/1991 | Breed | 280/735 |
| 5,003,240 A | 3/1991 | Ikeda | 364/424.05 |
| 5,006,771 A | 4/1991 | Ogasawara | 318/568.1 |
| 5,008,946 A | 4/1991 | Ando | 180/167 |
| 5,071,160 A | 12/1991 | White et al. | 280/735 |
| 5,074,583 A | 12/1991 | Fujita et al. | 280/735 |
| 5,095,257 A | 3/1992 | Ikeda et al. | 364/424.05 |
| 5,151,944 A | 9/1992 | Yamamura | 381/151 |
| 5,161,820 A | 11/1992 | Vollmer | 280/730.1 |
| 5,181,763 A | 1/1993 | Dellanno et al. | 297/397 |
| 5,205,585 A | 4/1993 | Reuber et al. | 280/753 |

(List continued on next page.)

FOREIGN PATENT DOCUMENTS

| | | |
|---|---|---|
| GB | 2301906 | 12/1996 |
| WO | 94/22693 | 10/1994 |

OTHER PUBLICATIONS

Viano, David C. & Gargan, Martin F., "Headrest Position During Normal Driving, Implication to Neck Injury in Rear Crashes", Acad. Anal. And Prev., vol. 28, No. 6, pp. 665–674 Elsevier Science, Ltd.

Primary Examiner—Anthony D. Barfield
(74) Attorney, Agent, or Firm—Brian Roffe

(57) ABSTRACT

System and method for moving a headrest against which an occupant can rest his or her head in which an anticipatory crash sensor detects an impending crash based on data obtained prior to the crash and a movement mechanism moves the headrest upon detection of an impending crash by the crash sensor. The crash sensor may produce an output signal when an object external from the vehicle is approaching the vehicle at a velocity above a design threshold velocity. The crash sensor may be any type of sensor designed to provide an assessment or determination of an impending impact prior to the impact, i.e., from data obtained prior to the impact Thus, the crash sensor can be an ultrasonic sensor, an electromagnetic wave sensor, a radar sensor, a noise radar sensor and a camera, a scanning laser radar and a passive infrared sensor.

61 Claims, 14 Drawing Sheets

U.S. PATENT DOCUMENTS

| | | |
|---|---|---|
| 5,290,091 A | 3/1994 | Dellanno et al. ............ 297/408 |
| 5,330,226 A | 7/1994 | Gentry et al. ................ 280/735 |
| 5,364,164 A | 11/1994 | Kuranami ................... 297/408 |
| 5,378,043 A | 1/1995 | Viano et al. ................. 297/408 |
| 5,484,189 A | 1/1996 | Patterson .................... 297/410 |
| 5,580,124 A | 12/1996 | Dellanno ............... 297/216.12 |
| 5,694,320 A | 12/1997 | Breed .................... 364/424.05 |
| 5,748,473 A | 5/1998 | Breed et al. ................... 701/45 |
| 5,769,489 A | 6/1998 | Dellanno ............... 297/216.14 |
| 5,795,019 A | 8/1998 | Wieclawski ........... 297/216.12 |
| 5,822,707 A | 10/1998 | Breed et al. .................. 701/49 |
| 5,833,312 A | 11/1998 | Lenz ..................... 297/216.13 |
| 5,836,647 A | 11/1998 | Turman ................... 297/216.1 |
| 5,911,433 A | 6/1999 | Swann .................... 280/730.2 |
| 5,927,804 A | 7/1999 | Cuevas ................. 297/216.12 |
| 5,961,182 A | 10/1999 | Dellanno ............... 297/216.12 |
| 6,017,086 A | 1/2000 | Meyer et al. ........... 297/216.12 |
| 6,022,074 A | 2/2000 | Swedenklef ........... 297/216.14 |
| 6,042,145 A | 3/2000 | Mitschelen et al. ......... 280/735 |
| 6,082,817 A | 7/2000 | Muller ................... 297/216.12 |
| 6,088,640 A | 7/2000 | Breed ........................... 701/45 |
| 6,158,812 A | 12/2000 | Bonke ........................ 297/391 |
| 6,199,900 B1 | 3/2001 | Zeigler ....................... 280/735 |
| 6,213,548 B1 * | 4/2001 | Van Wynsberghe et al. ..................... 297/216.12 |
| 6,331,014 B1 | 12/2001 | Breed ...................... 280/730.1 |
| 6,352,285 B1 * | 3/2002 | Schulte et al. ......... 297/216.12 |
| 6,478,373 B1 * | 11/2002 | Hake et al. ............ 297/216.12 |
| 6,607,242 B2 * | 8/2003 | Estrada et al. ......... 297/216.12 |

* cited by examiner

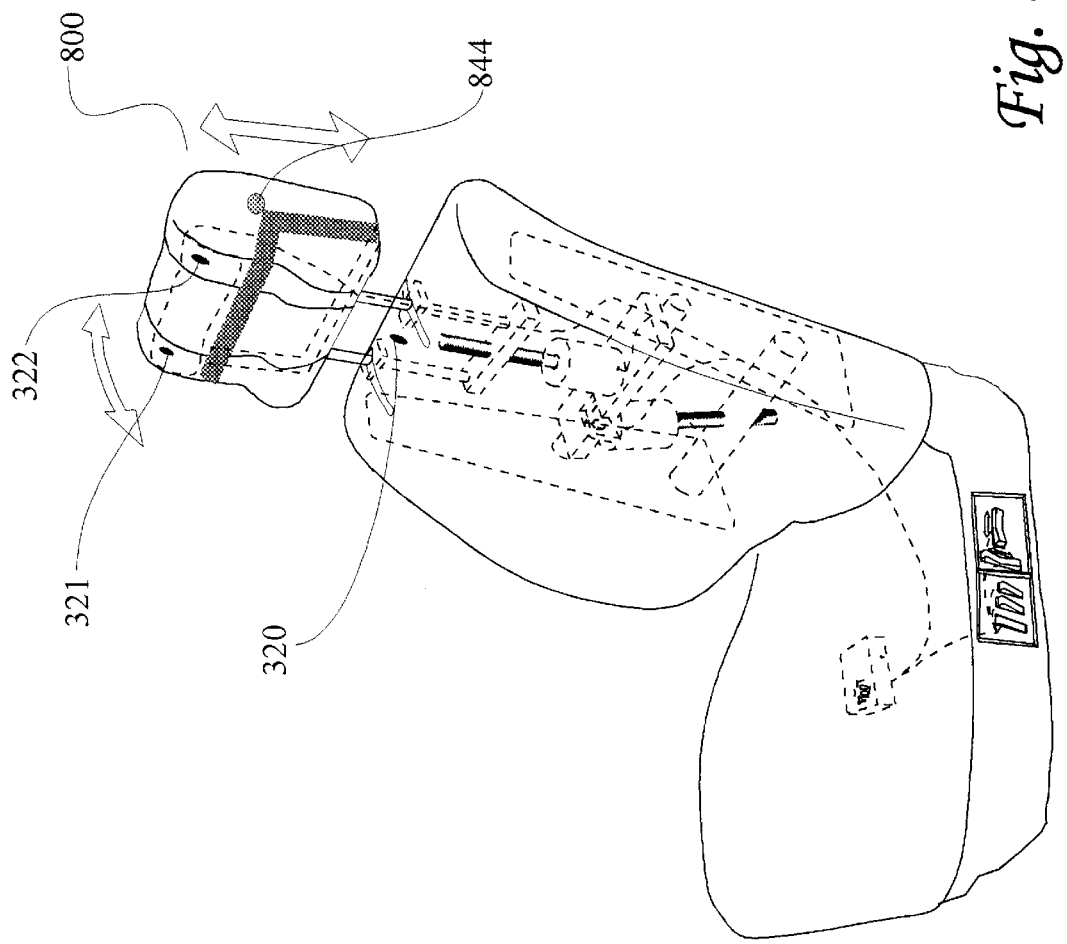

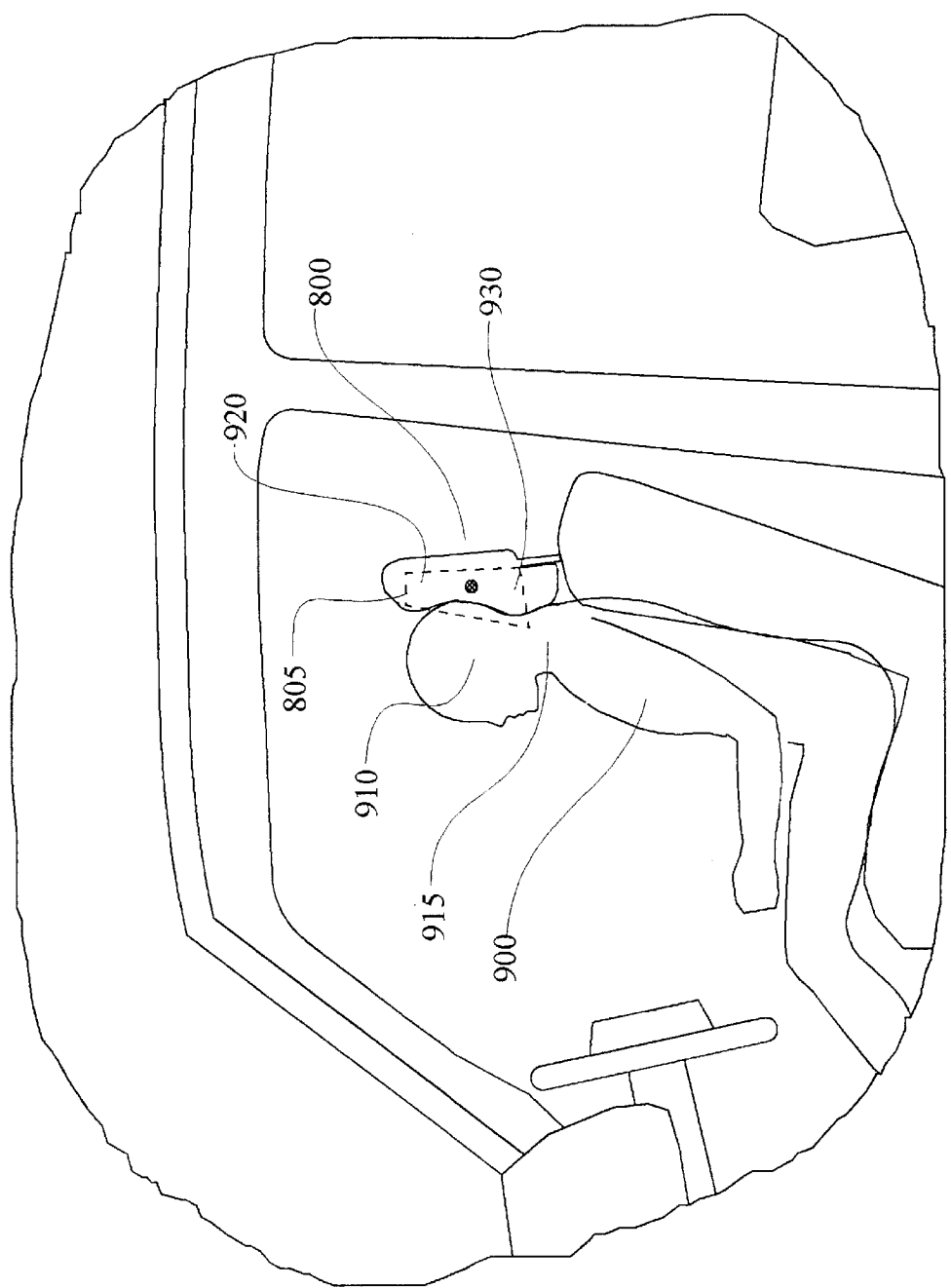

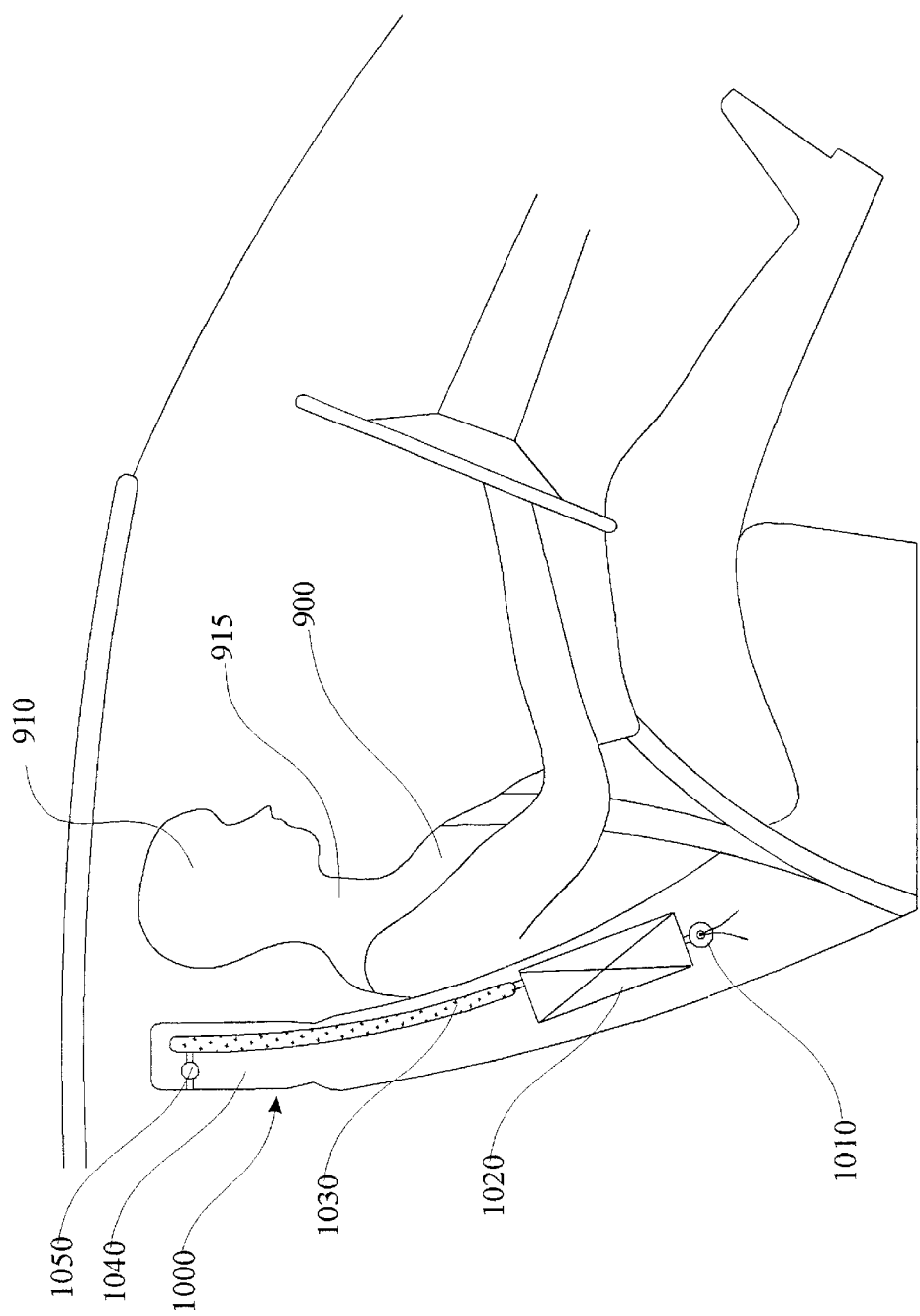

SYSTEM AND METHOD FOR MOVING A HEADREST BASED ON ANTICIPATORY SENSING

CROSS-REFERENCE TO RELATED APPLICATIONS

This application is a continuation-in-part of U.S. patent application Ser. No. 09/613,925 filed Jul. 11, 2000 still pending, which in turn is a continuation-in-part of U.S. patent application Ser. No. 08/992,525, filed Dec. 17, 1997, now U.S. Pat. No. 6,088,640.

This application is related to U.S. Pat. No. 5,694,320 issued Dec. 2, 1997 and U.S. Pat. No. 6,331,014 issued Dec. 18, 2001, on the grounds that it includes common subject matter.

FIELD OF THE INVENTION

This invention relates generally to systems and methods for moving a headrest of a vehicular seat to protect an occupant in a crash and more particularly, to systems and methods for moving a headrest based on anticipatory sensing of a crash to protect the occupant in the crash.

BACKGROUND OF THE INVENTION

Approximately 100,000 rear impacts per year result in whiplash injuries to the vehicle occupants. Most of these injuries could be prevented if the headrest were properly positioned behind the head of the occupant and if it had the correct contour to properly support the head and neck of the occupant. Whiplash injuries are the most expensive automobile accident injury even though these injuries are usually are not life threatening and are usually classified as minor.

A good discussion of the causes of whiplash injuries in motor vehicle accidents can be found in Dellanno et al, U.S. Pat. Nos. 5,181,763 and 5,290,091, and Dellanno, U.S. Pat. Nos. 5,580,124, 5,769,489 and 5,961,182, which are incorporated herein by reference, as well as many other technical papers. These patents discuss a novel automatic adjustable headrest to minimize such injuries. However, these patents assume that the headrest is properly positioned relative to the head of the occupant. A survey has shown that as many as 95% of automobiles do not have the headrest properly positioned. These patents also assume that all occupants have approximately the same contour of the neck and head. Observations of humans, on the other hand, show that significant differences occur where the back of some people's heads is almost in the same plane as the that of their neck and shoulders, while other people have substantially the opposite case, that is, their neck extends significantly forward of their head back and shoulders One proposed attempt at solving the problem where the headrest is not properly positioned uses a conventional crash sensor which senses the crash after impact and a headrest composed of two portions, a fixed portion and a movable portion. During a rear impact, a sensor senses the crash and pyrotechnically deploys a portion of the headrest toward the occupant. This system has the following potential problems:

1) An occupant can get a whiplash injury in fairly low velocity rear impacts; thus, either the system will not protect occupants in such accidents or there will be a large number of low velocity deployments with the resulting significant repair expense.
2) If the portion of the headrest which is propelled toward the occupant has significant mass, that is if it is other than an airbag type device, there is a risk that it will injure the occupant. This is especially true if the system has no method of sensing and adjusting for the position of the occupant.
3) If the system does not also have a system which pre-positions the headrest to the proximity of the occupant's head, it will also not be affective when the occupant's head is forward due to pre-crash braking, for example, or for different sized occupants.

A variation of this approach uses an airbag positioned in the headrest which is activated by a rear impact crash sensor This system suffers the same problems as the pyrotechnically deployed headrest portion. Unless the headrest is pre-positioned, there is a risk for the out-of-position occupant.

U.S. Pat. No. 5,833,312 to Lenz describes several methods for protecting an occupant from whiplash injuries using the motion of the occupant loading the seat back to stretch a canvas or deploy an airbag using fluid contained within a bag inside the seat back In the latter case, the airbag deploys out of the top of the seat back and between the occupant's head and the headrest. The system is based on the proposed fact that "[F]irstly the lower part of the body reacts and is pressed, by a heavy force, against the lower part of the seat back, thereafter the upper part of the body trunk is pressed back, and finally the back of the head and the head is thrown back against the upper part of the seat back . . . " (Col. 2 lines 47–53). Actually this does not appear to be what occurs. Instead, the vehicle, and thus the seat that is attached to it, begins to decelerate while the occupant continues at its pre-crash velocity. Those parts of the occupant that are in contact with the seat experience a force from the seat and begin to slow down while other parts, the head for example continue moving at the pre crash velocity. In other words, all parts of the body are "thrown back" at the same time. That is, they all have the same relative velocity relative to the seat until acted on by the seat itself. Although there will be some mechanical advantage due to the fact that the area in contact with the occupant's back will generally be greater than the area needed to support his or her head, there generally will not be sufficient motion of the back to pump sufficient gas into the airbag to cause it to be projected in between the head that is not rapidly moving toward the headrest. In some cases, the occupant's head is very close to the headrest and in others it is far away. For all cases except when the occupant's head is very far away, there is insufficient time for motion of the occupant's back to pump air and inflate the airbag and position it between the head and the headrest. Thus, not only will the occupant impact the headrest and receive whiplash injuries, but it will also receive an additional impact from the deploying airbag.

Lenz also suggests that for those cases where additional deployment speed is required, that the output from a crash sensor could be used in conjunction with a pyrotechnic element. Since he does not mention anticipatory crash sensor, which were not believed to be available at the time of the filing of the Lenz patent application, it must be assumed that a conventional crash sensor is contemplated. As discussed herein, this is either too slow or unreliable since if it is set so sensitive that it will work for low speed impacts where many whiplash injuries occur, there will be many deployments and the resulting high repair costs. For higher speed crashes, the deployment time will be too slow based on the close position of the occupant to the airbag Thus, if a crash sensor is used, it must be an anticipatory crash sensor as disclosed herein.

OBJECTS AND SUMMARY OF THE INVENTION

It is an object of the present invention to provide new and improved headrests for seats in a vehicle which offer protection for an occupant in the event of a crash involving the vehicle.

It is another object of the present invention to provide new and improved seats for vehicles which offer protection for an occupant in the event of a crash involving the vehicle.

It is still another object of the present invention to provide new and improved cushioning arrangements for vehicles and protection systems including cushioning arrangements which provide protection for occupants in the event of a crash involving the vehicle.

It is yet another object of the present invention to provide new and improved cushioning arrangements for vehicles and protection systems including cushioning arrangements which provide protection for occupants in the event of a collision into the rear of the vehicle, i.e., a rear impact.

It is yet another object of the present invention to provide new and improved vehicular systems which reduce whiplash injuries from rear impacts of a vehicle by causing the headrest to be automatically positioned proximate to the occupant's head.

It is yet another object of the present invention to provide new and improved vehicular systems to position a headrest proximate to the head of a vehicle occupant prior to a pending impact into the rear of a vehicle.

It is yet another object of the present invention to provide a simple anticipatory sensor system for use with an adjustable headrest to predict a rear impact.

It is yet another object of the present invention to provide a method and arrangement for protecting an occupant in a vehicle during a crash involving the vehicle using an anticipatory sensor system and a cushioning arrangement including a fluid-containing bag which is brought closer toward the occupant or ideally in contact with the occupant prior to or coincident with the crash. The bag would then conform to the portion of the occupant with which it is in contact.

It is yet another object of the present invention to provide an automatically adjusting system which conforms to the head and neck geometry of an occupant regardless of the occupant's particular morphology to properly support both the head and neck.

Other objects and advantages of this invention will become apparent from the disclosure which follows.

In order to achieve at least one of the foregoing objects, a vehicle in accordance with the invention comprises a seat including a movable headrest against which an occupant can rest his or her head, an anticipatory crash sensor arranged to detect an impending crash involving the vehicle based on data obtained prior to the crash, and a movement mechanism coupled to the crash sensor and the headrest and arranged to move the headrest upon detection of an impending crash involving the vehicle by the crash sensor.

The crash sensor may be arranged to produce an output signal when an object external from the vehicle is approaching the vehicle at a velocity above a design threshold velocity. The crash sensor may be any type of sensor designed to provide an assessment or determination of an impending impact prior to the impact, i.e., from data obtained prior to the impact. Thus, the crash sensor can be an ultrasonic sensor, an electromagnetic wave sensor, a radar sensor, a noise radar sensor and a camera, a scanning laser radar and a passive infrared sensor.

To optimize the assessment of an impending crash, the crash sensor can be designed to determine the distance from the vehicle to an external object whereby the velocity of the external object is calculatable from successive distance measurements To this end, the crash sensor can employ means for measuring time of flight of a pulse, means for measuring a phase change, means for measuring a Doppler radar pulse and means for performing range gating of an ultrasonic pulse, an optical pulse or a radar pulse.

To further optimize the assessment, the crash sensor may comprise pattern recognition means for recognizing, identifying or ascertaining the identity of external objects. The pattern recognition means may comprise a neural network, fuzzy logic, fuzzy system, neural-fuzzy system, sensor fusion and other types of pattern recognition systems.

The movement mechanism may be arranged to move the headrest from an initial position to a position more proximate to the head of the occupant.

Optionally, a determining system determines the location of the head of the occupant in which case, the movement mechanism may move the headrest from an initial position to a position more proximate to the determined location of the head of the occupant. The determining system can include a wave-receiving sensor arranged to receive waves from a direction of the head of the occupant. More particularly, the determining system can comprise a transmitter for transmitting radiation to illuminate different portions of the head of the occupant, a receiver for receiving a first set of signals representative of radiation reflected from the different portions of the head of the occupant and providing a second set of signals representative of the distances from the headrest to the nearest illuminated portion the head of the occupant, and a processor comprising computational means to determine the headrest vertical location corresponding to the nearest part of the head to the headrest from the second set of signals from the receiver. The transmitter and receiver may be arranged in the headrest.

The head position determining system can be designed to use waves, energy, radiation or other properties or phenomena. Thus, the determining system may include an electric field sensor, a capacitance sensor, a radar sensor, an optical sensor, a camera, a three-dimensional camera, a passive infrared sensor, an ultrasound sensor, a stereo sensor, a focusing sensor and a scanning system.

A processor may be coupled to the crash sensor and the movement mechanism and determines the motion required of the headrest to place the headrest proximate to the head. The processor then provides the motion determination to the movement mechanism upon detection of an impending crash involving the vehicle by the crash sensor. This is particularly helpful when a system for determining the location of the head of the occupant relative to the headrest is provided in which case, the determining system is coupled to the processor to provide the determined head location.

A method for protecting an occupant of a vehicle during a crash in accordance with the invention comprises the steps of detecting an impending crash involving the vehicle based on data obtained prior to the crash and moving a headrest upon detection of an impending crash involving the vehicle to a position more proximate to the occupant. Detection of the crash may entail determining the velocity of an external object approaching the vehicle and producing a crash signal when the object is approaching the vehicle at a velocity above a design threshold velocity.

Optionally, the location of the head of the occupant is determined in which case, the headrest is moved from an initial position to the position more proximate to the determined location of the head of the occupant

BRIEF DESCRIPTION OF THE DRAWINGS

For a more complete understanding of the present invention, reference is made to the following detailed description and accompanying drawings. In the drawings, like reference characters refer to like parts throughout the several views, in which:

FIG. 8 is a perspective view of an of automatically adjusting head and neck supporting headrest;

FIG. 9B is a view as in FIG. 9A with the headrest in the head contact position as would happen in anticipation of a rear crash; and FIG. 10A is a side view of an occupant seated in the driver seat of an automobile having an integral seat and headrest and an inflatable pressure controlled bladder with the bladder in the normal position;

DETAILED DESCRIPTION OF THE PREFERRED EMBODIMENTS

Figure 1:
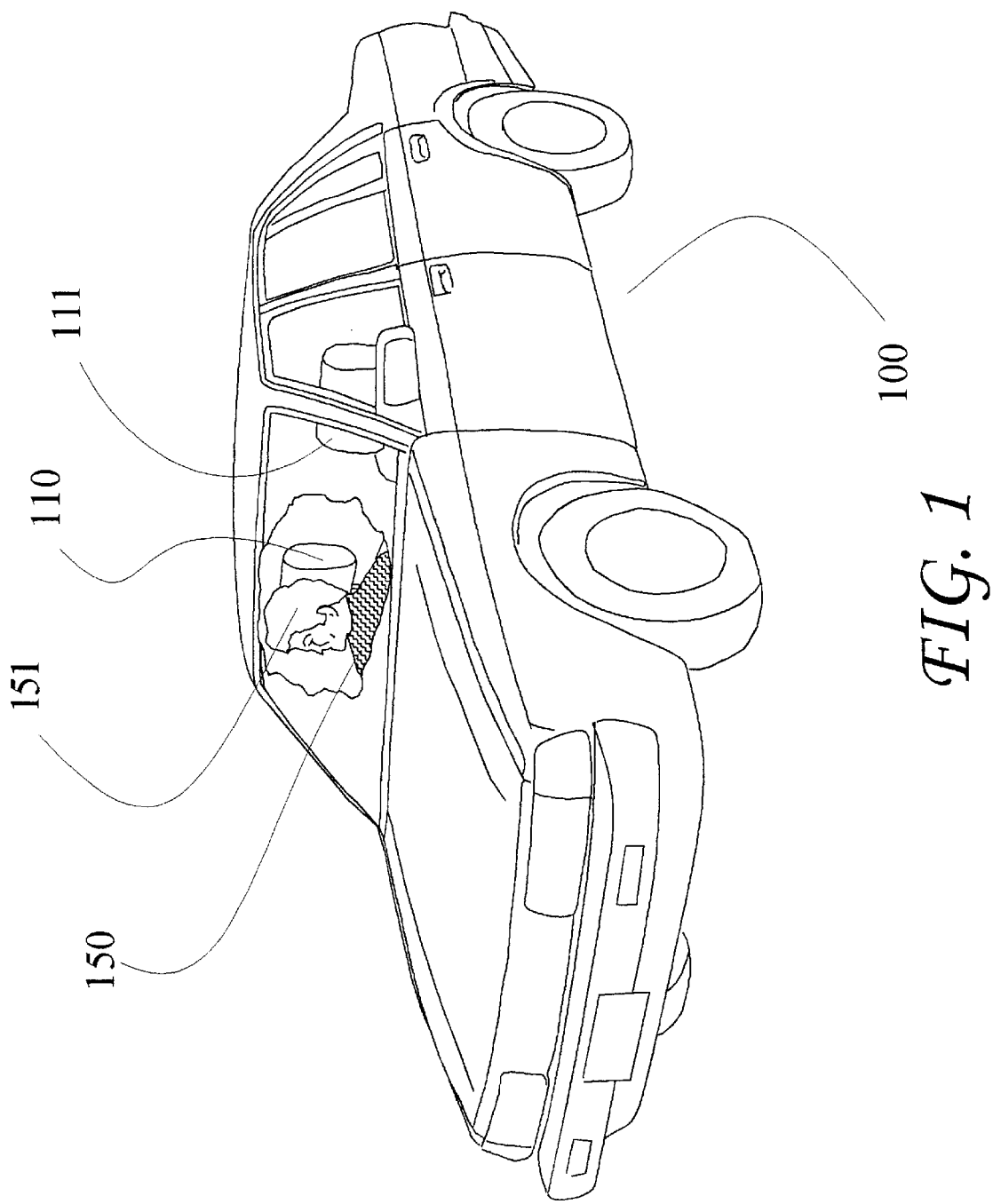
FIG. 1 is perspective view with portions cut away of a motor vehicle having a movable headrest and an occupant sitting on the seat with the headrest adjacent the head of the occupant to provide protection in rear impacts.

Referring to the accompanying drawings wherein like reference characters refer to the same or similar elements, FIG. 1 is perspective view with portions cut away of a motor vehicle, shown generally at 100, having two movable headrests 110 and 111 and an occupant 150 sitting on the seat with the headrest 110 adjacent a head 151 of the occupant to provide protection in rear impacts.

Figure 2:
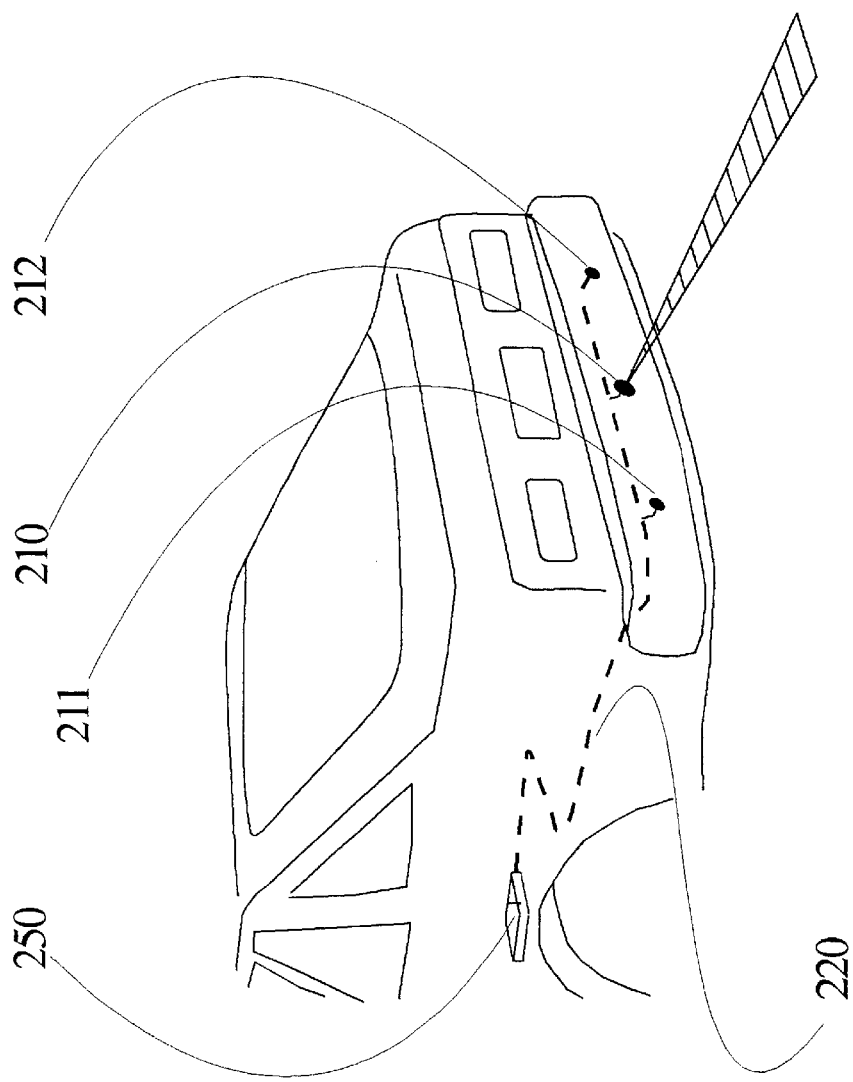
FIG. 2 is a perspective view of the rear portion of the vehicle shown in FIG. 1 showing a rear crash anticipatory sensor connected to an electronic circuit for controlling the position of the headrest in the event of a crash.

In FIG. 2 a perspective view of the rear portion of the vehicle shown in FIG. 1 is shown with a rear impact crash anticipatory sensor, comprising a transmitter 210 and two receivers 211 and 212, connected by appropriate electrical connections, e g., wire 220, to an electronic circuit or control module 250 for controlling the position of the headrest in the event of a crash In U.S. patent application Ser. No. 09/307,883 filed May 10, 1999, an anticipatory sensor system for side impacts is disclosed. This sensor system uses sophisticated pattern recognition technology to differentiate different categories of impacting vehicles. A side impact with a large truck at 20 mph is more severe than an impact with a motorcycle at 40 mph, and, since in that proposed airbag system the driver would no longer be able to control the vehicle, the airbag must not be deployed except in life threatening situations. Therefore, it is critical in order to predict the severity of a side impact, to know the type of impacting vehicle.

To improve the assessment of the impending crash, the crash sensor will optimally determine the position and velocity of an approaching object. The crash sensor can be designed to use differences between the transmitted and reflected waves to determine the distance between the vehicle and the approaching object and from successive distance measurements, the velocity of the approaching object. In this regard, the difference between the transmitted and received waves or pulses may be reflected in the time of flight of the pulse, a change in the phase of the pulse and/or a Doppler radar pulse, or by range gating an ultrasonic pulse, an optical pulse or a radar pulse. As such, the crash sensor can comprise a radar sensor, a noise radar sensor, a camera, a scanning laser radar and/or a passive infrared sensor.

The situation is quite different in the case of rear impacts and the headrest system described herein. The movement of the headrest to the proximity of an occupant's head is not likely to affect his or her ability to control the automobile. Also, it is unlikely that anything but another car or truck will be approaching the rear of the vehicle at a velocity relative to the vehicle of greater than 8 mph, for example. The one exception is a motorcycle and it would not be serious if the headrest adjusted in that situation Thus, a simple ranging sensor is all that is necessary. There are, of course, advantages in using a more sophisticated pattern recognition system as will be discussed below.

FIG. 2, therefore, illustrates a simple ranging sensor using a transmitter 210 and two receivers 211 and 212. Transmitter 210 may be any wave-generating device such as an ultrasonic transmitter while the receivers 211,212 are compatible wave-receiving devices such as ultrasonic receivers. The ultrasonic transmitter 210 transmits ultrasonic waves These transducers are connected to the electronic control module (ECM) 250 by means of wire 220, although other possible connecting means (wired or wireless) may also be used in accordance with the invention. Naturally, other configurations of the transmitter 210, receivers 211,212 and ECM 250 might be equally or more advantageous. The sensors determine the distance of the approaching object and determine its velocity by differentiating the distance measurements or by use of the Doppler effect or other appropriate method. Although an ultrasonic system is illustrated herein, radar, electromagnetic, e.g., optical, or other systems could also be used as well as any appropriate number of transmitters and receivers.

Although a system based on ultrasonics is generally illustrated and described above and represents one of the best mode of practicing this invention, it will be appreciated by those skilled in the art that other technologies employing electromagnetic energy such as optical, infrared, radar, capacitance etc. could also be used. Also, although the use of reflected energy is disclosed, any modification of the energy by an object behind the vehicle is contemplated including absorption, phase change, transmission and reemission or even the emission or reflection of natural radiation. Such modification can be used to determine the presence of an object behind the vehicle and the distance to the object.

Thus, the system for determining the location of the head of the occupant can comprise an electric field sensor, a capacitance sensor, a radar sensor, an optical sensor, a camera, a three-dimensional camera, a passive infrared sensor, an ultrasound sensor, a stereo sensor, a focusing sensor and a scanning system. One skilled in the art would be able to apply these systems in the invention in view of the disclosure herein and the knowledge of the operation of such systems attributed to one skilled in the art.

Although pattern recognition systems, such as neural nets, might not be required, such a system would be desirable. With pattern recognition, other opportunities become available such as the determination of the nature of objects behind the vehicle. This could be of aid in locating and recognizing objects, such as children, when vehicles are backing up and for other purposes. Although some degree of pattern recognition can be accomplished with the system illustrated in FIG. 2, especially if an optical system is used instead of the ultrasonic system illustrated, additional transducers significantly improve the accuracy of the pattern recognition systems if either ultrasonics or radar systems are used.

Figure 3:
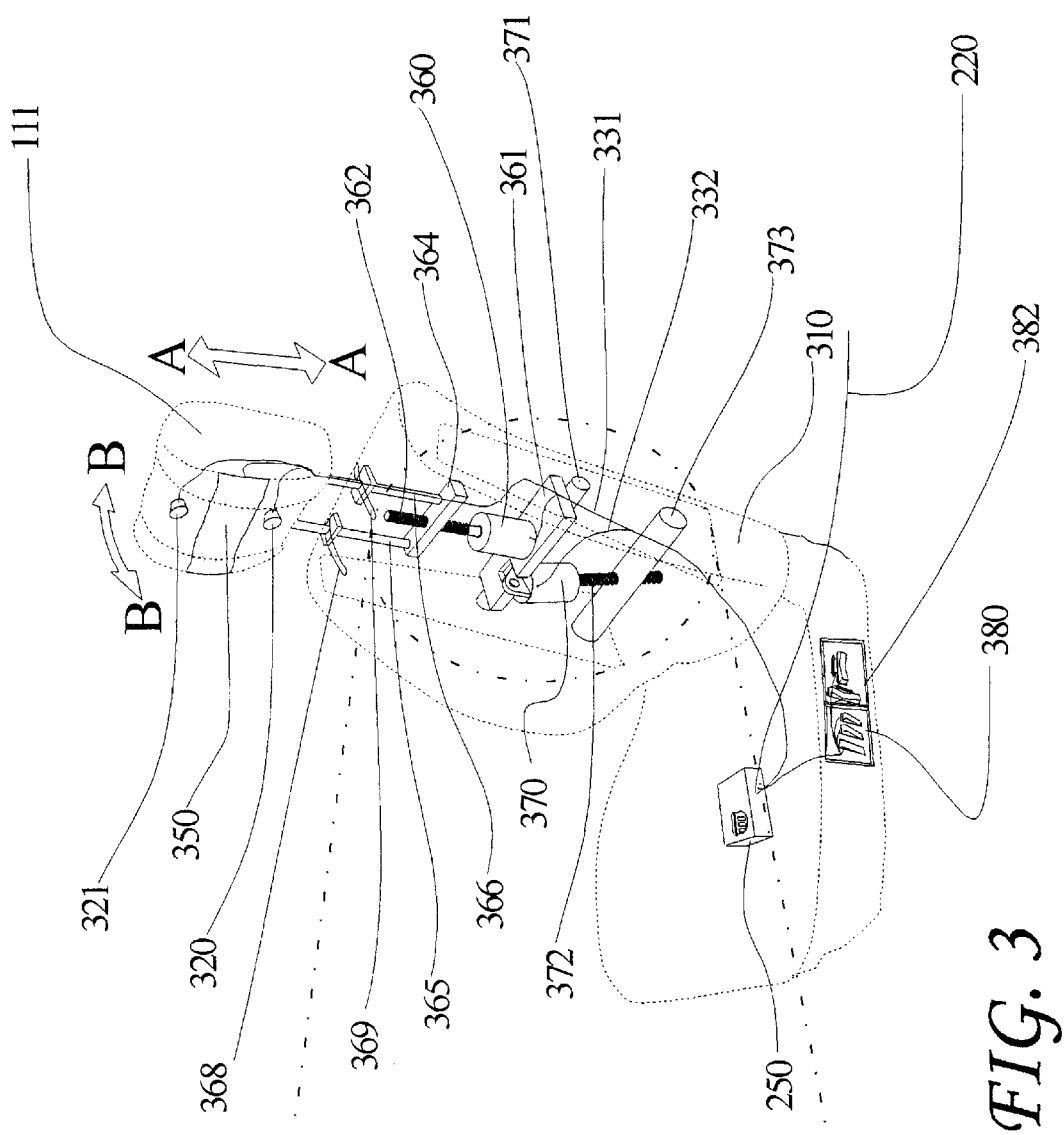
FIG. 3 is a perspective view of a headrest control mechanism mounted in a vehicle seat and ultrasonic head location sensors consisting of one transmitter and one receiver plus a head contact sensor, with the seat and headrest shown in phantom.

The wire 220 shown in FIG. 2 leads to the electronic control module 250 which is also shown in FIG. 3. FIG. 3 is a perspective view of a headrest actuation mechanism, mounted in a vehicle seat 310, and transducers 320,321 plus a head contact sensor 350. Transducer 320 may be an ultrasonic transmitter and transducer 321 may be an ultrasonic receiver. The transducers 320,321 may be based on any type of propagating phenomenon such as electromagnetics (for example capacitive systems), and are not limited to use with ultrasonics. The seat 310 and headrest 111 are shown in phantom. Vertical motion of the headrest 111 is accomplished when a signal is sent from control module 250 to servomotor 360 through wire 331. Servomotor 360 rotates lead screw 362 which mates with a threaded hole in elongate member 364 causing it to move up or down depending on the direction of rotation of the lead screw 362. Headrest support rods 365 and 366 are attached to member 364 and cause the headrest 111 to translate up or down with member 364. In this manner, the vertical position of the headrest 111 can be controlled as depicted by arrow A—A.

Wire 332 leads from the control module 250 to servomotor 370 which rotates lead screw 372. Lead screw 372 mates with a threaded hole in elongate, substantially cylindrical shaft 373 which is attached to supporting structures within the seat shown in phantom. The rotation of lead screw 372 rotates servo motor support 361 which in turn rotates headrest support rods 365 and 366 in slots 368 and 369 in the seat 310. In this manner, the headrest 111 is caused to move in the fore and aft direction as depicted by arrow B—B. Naturally there are other designs which accomplish the same effect of moving the headrest to where it is proximate to the occupant's head The operation of the system is as follows. When an occupant is seated on a seat containing the headrest and control system described above, the transducer 320 emits ultrasonic energy which reflects off of the back of the head of the occupant and is received by transducer 321. An electronic circuit containing a microprocessor determines the distance from the head of the occupant based on the time period between the transmission and reception of an ultrasonic pulse. The headrest 111 moves up and/or down until it finds the vertical position at which it is closest to the head of the occupant The headrest remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in the longitudinal measurement. This problem is solved in an accident through the use of a contact switch 350 on the surface of the headrest. When the headrest contacts a hard object, such as the rear of an occupant's head, the contact switch 350 closes and the motion of the headrest stops.

Although a system based on ultrasonics is generally illustrated and described above and represents the best mode of practicing this invention, it will be appreciated by those skilled in the art that other technologies employing electromagnetic energy such as optical, infrared, radar, capacitance etc. could also be used. Also, although the use of reflected energy is disclosed, any modification of the energy by the occupant's head is contemplated including absorption, capacitance change, phase change, transmission and reemission. Such modification can be used to determine the presence of the occupant's head adjacent the headrest and/or the distance between the occupant's head and the headrest.

When a vehicle approaches the target vehicle, the target vehicle containing the headrest and control system of this invention, the time period between transmission and reception of ultrasonic waves, for example, shortens indicating that an object is approaching the target vehicle. By monitoring the distance between the target vehicle and the approaching vehicle, the approach velocity of the approaching vehicle can the calculated and a decision made by the circuitry in control module 250 that an impact above a threshold velocity is about to occur. The control module 250 then sends signals to servo motors 370 and 360 to move the headrest to where it contacts the occupant in time to support the occupant's head and neck and reduce or eliminate a potential whiplash injury as explained in more detailed below.

The seat also contains two switch assemblies 380 and 382 for controlling the position of the seat 310 and headrest 111. The headrest control switches 382 permit the occupant to adjust the position of the headrest in the event that the calculated position is uncomfortably close to or far from the occupant's head A woman with a large hairdo might find that the headrest automatically adjusts so as to contact her hairdo. This might be annoying to the woman who could then position the headrest further from her head. For those vehicles which have a seat memory system for associating the seat position with a particular occupant, the position of the headrest relative to the occupant's head can also be recorded. Later when the occupant enters the vehicle, and the seat automatically adjusts to the occupant's recorded in memory preference, the headrest will similarly automatically adjust. In U.S. Pat. No. 5,822,437, incorporated by reference herein, a method of passively recognizing a particular occupant is disclosed.

Thus, an automatic adjustment results which moves the headrest to each specific occupant's desired and memorized headrest position. The identification of the specific individual occupant for which memory look-up or the like would occur can be by height sensors, weight sensors (for example placed in a seat), or by pattern recognition means, or a combination of these and other means, as disclosed in the above-referenced patent applications and granted patents.

Figure 5:
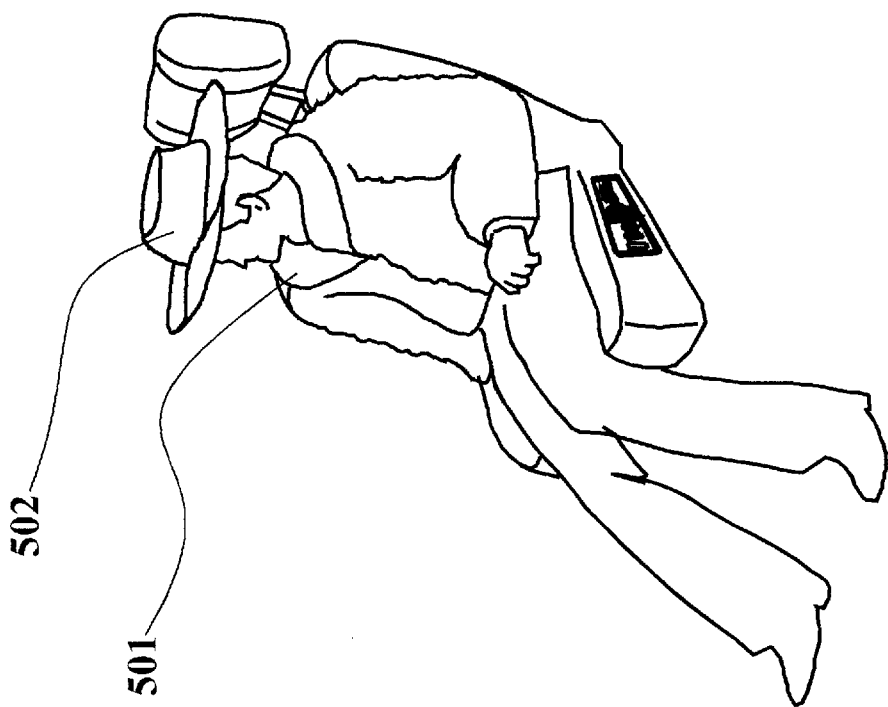
FIG. 5 is a perspective view of a male vehicle occupant wearing a winter coat and a large hat.
Figure 4:
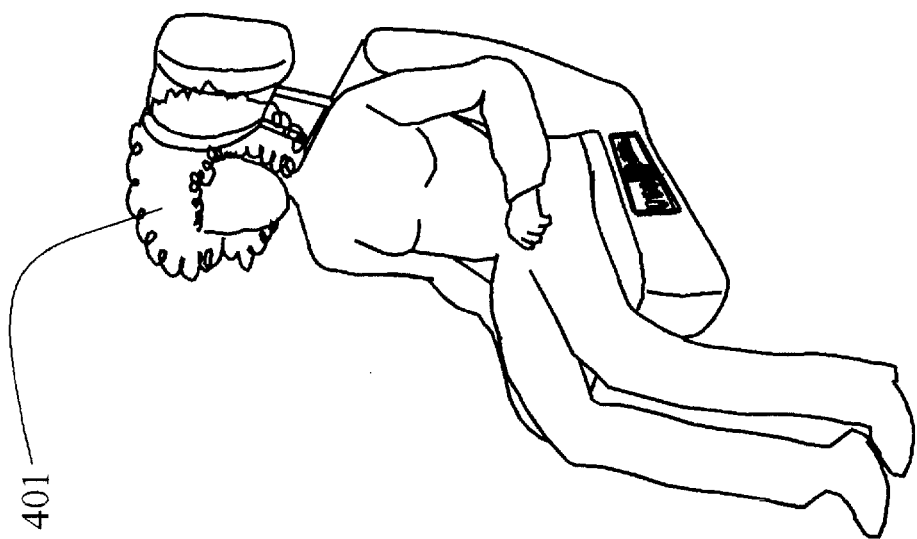
FIG. 4 is a perspective view of a female vehicle occupant having a large hairdo and also showing switches for manually adjusting the position of the headrest.

One advantage of this system is that it moves the headrest toward the occupant's head until it senses a resistance characteristic of the occupant's head Thus, the system will not be fooled by a high coat collar 501 or hat 502, as illustrated in FIG. 5, or other article of clothing or by a large hairdo 401 as illustrated in FIG. 4. The headrest continues to be moved until it contacts something relatively rigid as determined by the contact switch 350.

A key advantage of this system is that there is no permanent damage to the system when it deploys during an accident. After the event it will reset without an expensive repair. In fact, it can be designed to reset automatically.

An ultrasonic sensor in the headrest has previously been proposed in a U.S. patent to locate the occupant for the out-of-position occupant problem. In that system, no mention is made as to how to find the head. In the headrest location system described herein, the headrest can be moved up and down in response to the instant control systems to find the location of the back of the occupant's head. Once it has been found the same sensor is used to monitor the location of the person's head. Naturally, other methods of finding the location of the head of an occupant are possible.

Figure 6:
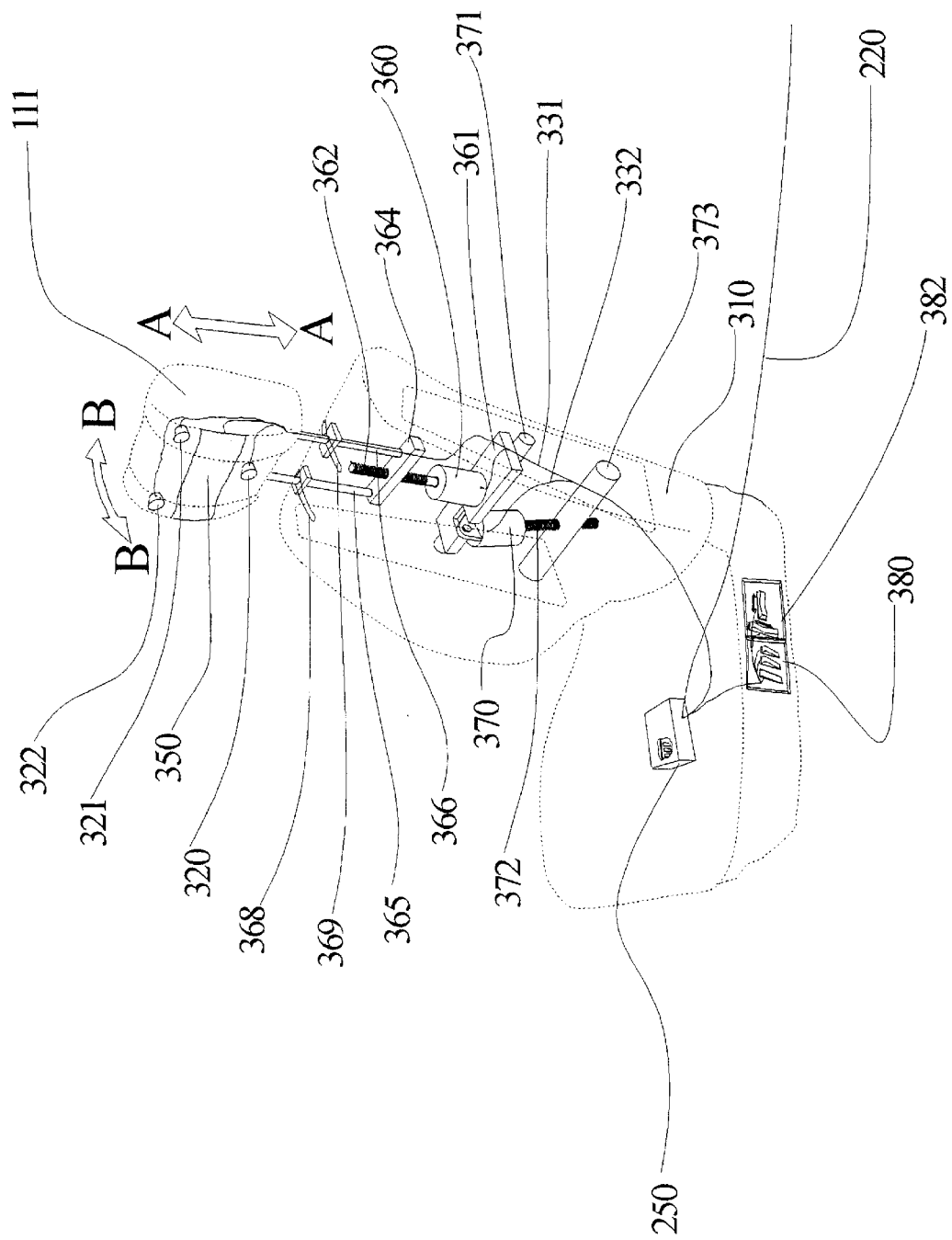
FIG. 6 is view similar to FIG. 3 showing an alternate design of a head sensor using one transmitter and three receivers for use with a pattern recognition system.

An improvement to the system described above results when pattern recognition technology is added. FIG. 6 is view similar to FIG. 3 showing an alternate design of a head sensor using three transducers 320, 321 and 322 for use with a pattern recognition system. Transducer 320 performs both as a transmitter and receiver while transducers 321,322 perform only as receivers Transducers 321,322 are placed on either side of transducer 320 and above the same. Using this system and an artificial neural network, or other pattern recognition system, as part of the electronic control module 250, an accurate determination of the location of an occupant's head can, in most cases, be accomplished even when the occupant has a large hairdo or hat. In this case, the system would be trained for a wide variety of different cases prior to installation into the vehicle This training is accomplished by placing a large variety of different occupants onto the driver's seat in a variety of different positions and recording digitized data from transducers 320, 321 and 322 along with data representing the actual location of the occupant's head. The different occupants include examples of large and small people, men and women, with many hair, hat, and clothing styles. Since each of these occupants is placed at a variety of different positions on the seat, the total data set, called the "training set", will consist of at least one thousand, and typically more than 100,000, cases This training set is then used to train the neural network, or other similar trainable pattern recognition technology, so that the resulting network can locate the occupant's head in the presence of the types of obstructions discussed above whatever an occupant occupies the driver's seat.

Figure 7:
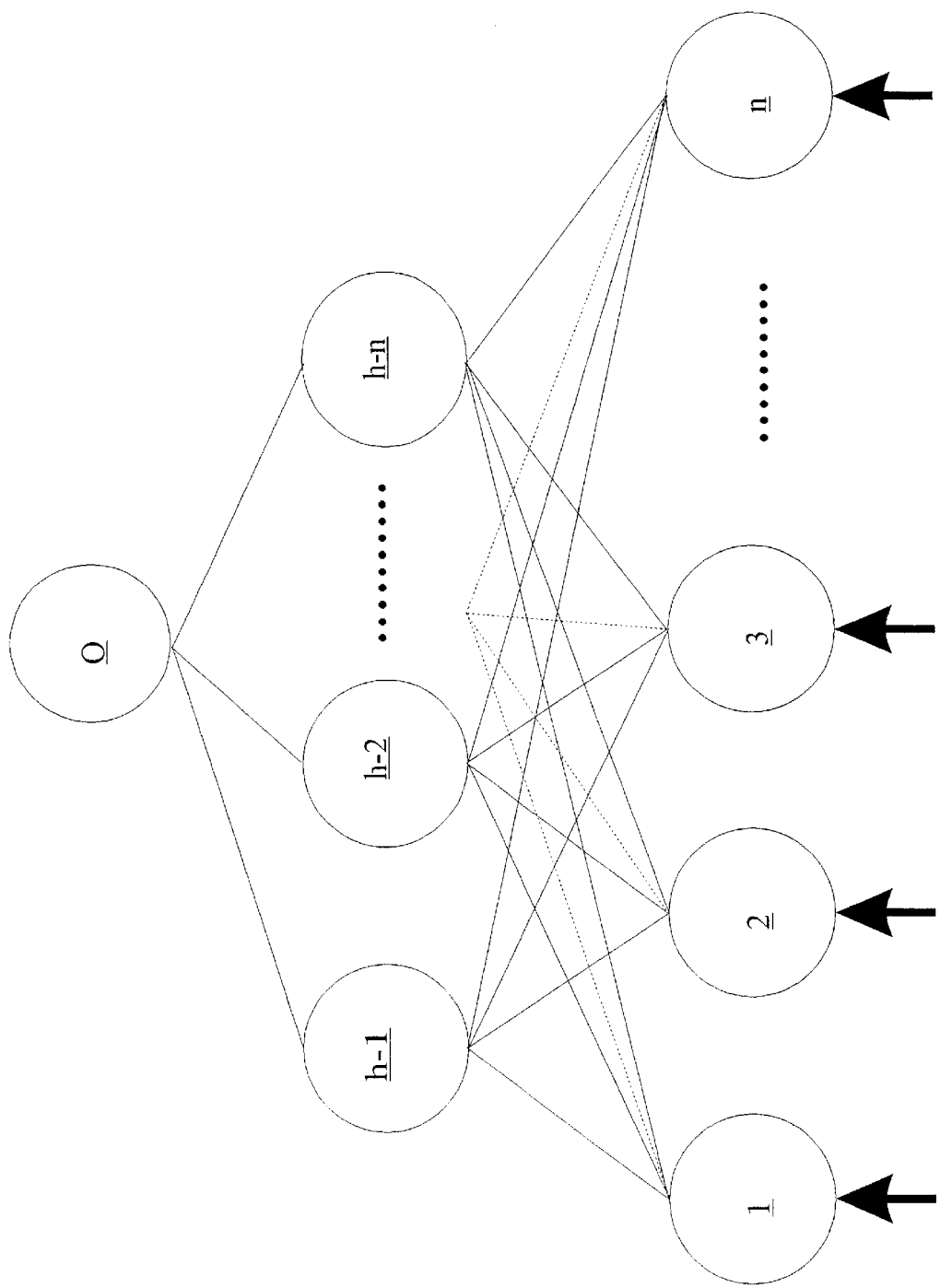
FIG. 7 is a schematic view of an artificial neural network pattern recognition system of the type used to recognize an occupant's head.

FIG. 7 is a schematic view of an artificial neural network of the type used to recognize an occupant's head. The theory of neural networks including many examples can be found in several books on the subject including: *Techniques And Application Of Neural Networks,* edited by Taylor, M. and Lisboa, P., Ellis Horwood, West Sussex, England, 1993; *Naturally Intelligent Systems,* by Caudill, M. and Butler, C., MIT Press, Cambridge Mass., 1990; and, *Digital Neural Networks,* by Kung, S. Y., PTR Prentice Hall, Englewood Cliffs, N.J., 1993. the neural network is presented here as an example of a pattern recognition technology. Other pattern recognition algorithms, such as neural-fuzzy systems, are being developed which, in some cases, have superior performance to pure neural networks.

The process of locating the head of an occupant can be programmed to begin when an event occurs such as the closing of a vehicle door or the shifting of the transmission out of the PARK position. The ultrasonic transmitting/receiving transducer 320, for example, transmits a train of ultrasonic waves toward the head of the occupant Waves reflected from the occupant's head are received by transducers 320, 321 and 322. An electronic circuit containing an analog to digital converter converts the received analog signal to a digital signal which is fed into the input nodes numbered 1, 2, 3, . . . n, shown on FIG. 7. The neural network algorithm compares the pattern of values on nodes 1 through N with patterns for which it has been trained, as discussed above. Each of the input nodes is connected to each of the second layer nodes, called the hidden layer, either electrically as in the case of a neural computer or through mathematical functions containing multiplying coefficients called weights, described in more detail below. The weights are determined during the training phase while creating the neural network as described in detail in the above text references. At each hidden layer node a summation occurs of the values from each of the input layer nodes, which have been operated on by functions containing the weights, to create a node value. Although an example using ultrasound has been described, the substitution of other sensors such as optical, radar or capacitors will now be obvious to those skilled in the art.

The hidden layer nodes are in like manner connected to the output layer nodes, which in this example is only a single node representing the longitudinal distance to the back of the occupant's head. During the training phase, the distance to the occupant's head for a large variety of patterns is taught to the system These patterns include cases where the occupant is wearing a hat, has a high collar, or a large hairdo, as discussed above, where a measurement of the distance to the back of the occupant's head cannot be directly measured When the neural network recognizes a pattern similar to one for which it has been trained, it then knows the distance to the occupant's head. The details of this process are described in the above listed referenced texts and will not be presented in detail here. The neural network pattern recognition system described herein is one of a variety of pattern recognition technologies which are based on training. The neural network is presented herein as one example of the class of technologies referred to as pattern recognition technologies. Ultrasonics is one of many technologies including optical, infrared, capacitive, radar, or other electromagnetic based technologies Although the reflection of waves was illustrated, any modification of the waves by the head of the occupant is anticipated including absorption, capacitance change, phase change, transmission and reemission. Additionally, the radiation emitted from the occupant's head can be used directly without the use of transmitted radiation Naturally, combinations of the above technologies can be used A time step, such as one tenth of a millisecond, is chosen as the period at which the analog to digital converter (ADC) averages the output from the ultrasonic receivers and feeds data to the input nodes. For one preferred embodiment of this invention, a total of one hundred input nodes is typically used representing ten milliseconds of received data. The input to each input node is a preprocessed combination of the data from the three receivers. In another implementation, separate input nodes would be used for each transducer. Alternately, the input data to the nodes can be the result of a preprocessing algorithm which combines the data taking into account the phase relationships of the three return signals to obtain a map or image of the surface of the head using the principles of phased array radar. Although a system using one transmitter and three receivers is discussed herein, where one transducer functions as both a transmitter and receiver, even greater resolution can be obtained if all three receivers also act as transmitters.

In the example above, one hundred input nodes, twelve hidden layer nodes and one output layer node are typically used. In this example received data from only three receivers were considered. If data from additional receivers is also available the number of input layer nodes could increase depending on the preprocessing algorithm used. If the same neural network is to be used for sensing rear impacts, one or more additional output nodes might be used, one for each decision. The theory for determining the complexity of a neural network for a particular application has been the subject of many technical papers as well as in the texts referenced above and will not be presented in detail here. Determining the requisite complexity for the example presented here can be accomplished by those skilled in the art of neural network design and is discussed briefly below.

The pattern recognition system described above defines a method of determining the probable location of the rear of the head of an occupant and, will therefore determine, if used in conjunction with the anticipatory rear impact sensor, where to position a deployable occupant protection device in a rear collision, and comprises the steps of:

(a) obtaining an ultrasonic, analog signal from transducers mounted in the headrest;

(b) converting the analog signal into a digital time series, (c) entering the digital time series data into a pattern recognition system such as a neural network, (d) performing a mathematical operation on the time series data to determine if the pattern as represented by the time series data is nearly the same as one for which the system has been trained; and (e) calculating the probable location of the occupant's head if the pattern is recognizable.

The particular neural network described and illustrated above contains a single series of hidden layer nodes In some network designs, more than one hidden layer is used although only rarely will more than two such layers appear. There are of course many other variations of the neural network architecture illustrated above, as well as other pattern recognition systems, which appear in the literature. For the purposes herein, therefore, "neural network" will be defined as a system wherein the data to be processed is separated into discrete values which are then operated on and combined in at least a two stage process and where the operation performed on the data at each stage is in general different for each of the discrete values and where the operation performed is at least determined through a training process. The operation performed is typically a multiplication by a particular coefficient or weight and by different operation, therefore is this example, a different weight is used for each discrete value.

The implementation of neural networks can take at least two forms, an algorithm programmed on a digital microprocessor or in a neural computer. Neural computer chips are just now becoming available and are beyond the price range of commercially acceptable head sensing applications at this time, however, the prices are expected to drop soon.

In the particular implementation described above, the neural network is typically trained using data from 1000 or more than 100,000 different combinations of people, clothes, wigs etc. There are, of course, other situations which have not been tested. As these are discovered, additional training will improve the performance of the pattern recognition head locator.

Once a pattern recognition system is implemented in a vehicle, the same system can be used for many other pattern recognition functions as described in the above referenced patents and patent applications. For example, in the current assignee's U.S. Pat. No. 5,829,782 referenced above, the use of neural networks as a preferred pattern recognition technology is disclosed for use in identifying a rear facing child seat located on the front passenger seat of an automobile. This same patent application also discloses many other applications of pattern recognition technologies for use in conjunction with monitoring the interior of an automobile passenger compartment.

As described in the above referenced patents to Dellanno and Dellanno et al., whiplash injuries typically occur when there is either no head support or when only the head of the occupant is supported during a rear impact. To minimize these injuries, both the head and neck should be supported. In Dellanno, the head and neck are supported through a pivoting headrest which first contacts the head of the occupant and then rotates to simultaneously support both the head and the neck. The force exerted by the head and neck onto the pivoting headrest is distributed based on the relative masses of the head and neck. Dellanno assumes that the ratio of these masses is substantially the same for all occupants and that the distances between centers of mass of the head and neck is approximately also proportional for all occupants To the extent that this is not true, a torque will be applied to the headrest and cause a corresponding torque to be applied to the head and neck of the occupant. Ideally, the head and neck would be supported with just the required force to counteract the inertial force of each item. Obviously this can only approximately be accomplished with the Dellanno pivoting headrest especially when one considers that no attempt has been made to locate the headrest relative to the occupant and the proper headrest position will vary from occupant to occupant. Dellanno also assumes that the head and neck will impact and in fact bounce off of the headrest A far more significant improvement to eliminating whiplash injuries can be accomplished by eliminating this head impact and the resulting rebound as is accomplished in the present invention.

Automobile engineers attempt to design vehicle structures so that in an impact the vehicle is accelerated at an approximately constant acceleration. It can be shown that this results in the most efficient use of the vehicle structure in absorbing the crash energy. It also minimizes the damage to the vehicle in a crash and thus the cost of repair. Let us assume, therefore, that in a particular rear impact that the vehicle accelerates at a constant 15 g acceleration. Let us also assume that the vehicle seat back is rigidly attached to the vehicle structure at least during the early part of the crash, so that up until shortly after the occupant's head has impacted the headrest the seat back also is accelerating at a constant 15 g's. Finally let us assume that the occupant's head is initially displaced 4 inches from the headrest and that during impact the head compresses the headrest 1 inch. When the occupant's head impacts the headrest it must now make up for the difference in velocity between the headrest and the head during the period that it is compressing the headrest 1 inch. It can be demonstrated that this requires an acceleration of approximately 75 g's or five times the acceleration which the bead would experience if it were in contact with the headrest at the time that the rear impact occurs.

The Dellanno headrest, as shown for example in FIG. 3 of U.S. Pat. No. 5,290,091, is a worthwhile addition to solving the whiplash problem after the headrest has been positioned against the head and neck of the occupant. The added value of the Dellanno design over simpler designs, especially considering the inertial effects of having to rapidly rotate the headrest while the crash is taking place, is probably not justified. FIG. 8 illustrates a headrest design which accomplishes the objectives of the Dellanno headrest in a far simpler structure and at less potential injury to the occupant.

Figure 8A:
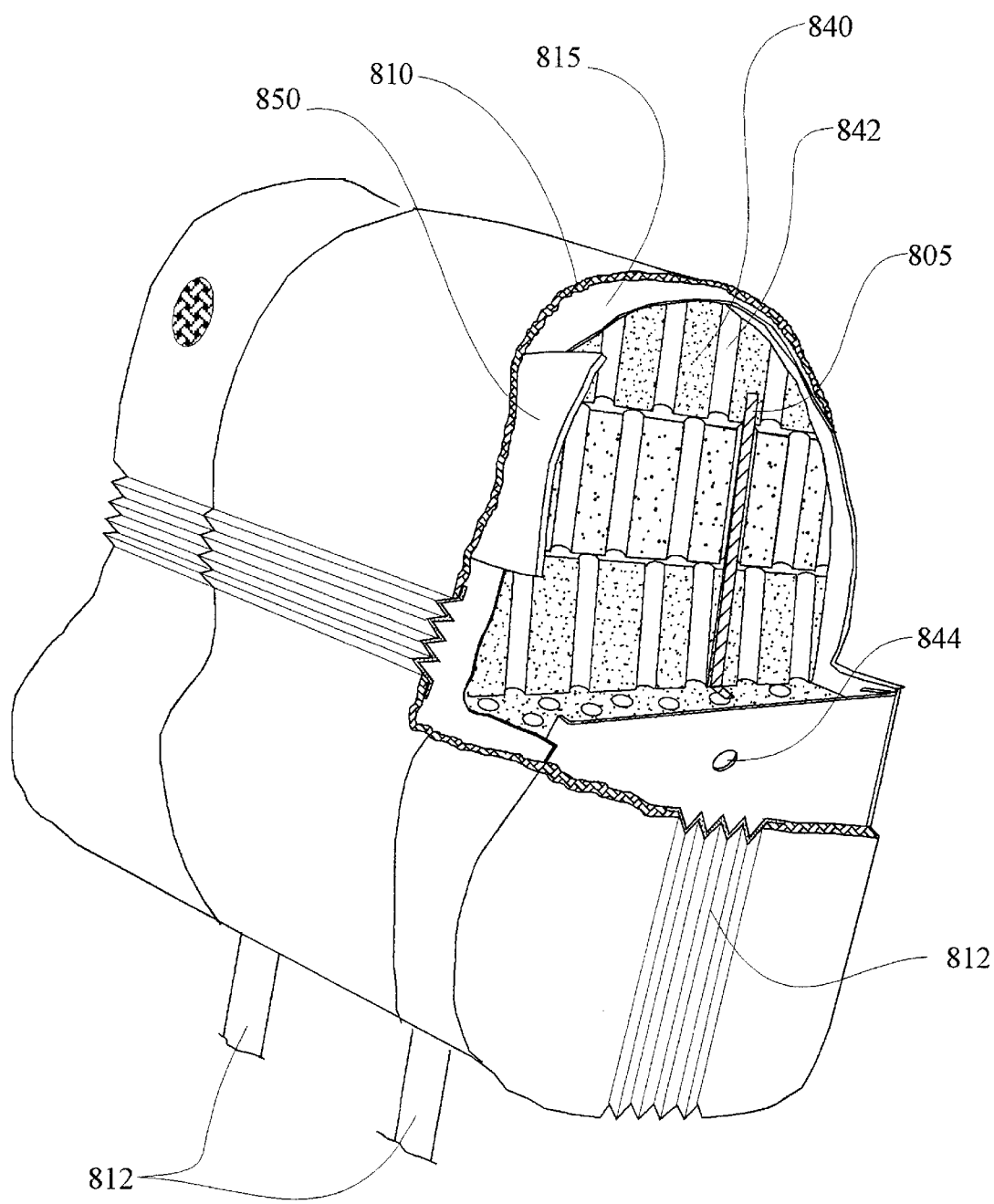
FIG. 8A is a perspective view with portions cut away and removed of the headrest of FIG. 8.

In FIG. 8, a seat with a movable headrest similar to the one illustrated in FIG. 3 is shown with a headrest designated 800 designed to provide support to both the head and neck which eliminates the shortcomings of the Dellanno headrest. The ultrasonic transducer 320, which includes both a transmitter and receiver, has been moved to an upper portion of the seat back, not the headrest, to facilitate the operation of the support system as described below. The construction of the headrest is illustrated in a cutaway view shown in FIG. 8A which is an enlarged view of the headrest of FIG. 8.

In FIG. 8A, the headrest is constructed of a support or frame 805 which is attached to rods 812 and extends along the sides and across the back of the headrest. Support 805 may be made of a somewhat rigid material. This support 805 helps control the motion of a pre-inflated bag 815 as it deforms under the force from the head of the occupant to where it contacts and provides support to the occupant's neck. Relatively low density open cell foam 840 surrounds the support 805 giving shape to the remainder of the headrest. As shown in FIG. 8A, the open call foam 840 can also have channels or openings 842 extending in a direction generally from a top of the headrest 800 to a bottom of the headrest 800, although such channels are not required. The direction of the channels or openings 842 facilitates the desired movement of the fluid in the bag 815 and constrains the fluid flow upon impact of the occupant's head against the headrest 800, i.e, a generally vertical movement in the case of the illustrated headrest 800. The open call foam 840 is covered by a thin membrane, possibly made from plastic, or the bag 815 (also referred to as an airbag herein which is appropriate when the fluid in the bag 815 is air-although the fluid within bag 815 may be other than air), and by a decorative cover 810 made of any suitable, acceptable material. The bag 815 is sealed surrounding the support 805 and plastic foam 840 such that any flow of fluid such as air into or out of the bag 815 is through a hole in the bag 815 adjacent to a vent hole 844 in the supporting structure, i.e., the cover 810 Elastic stretch seams 812 are placed in the sides, bottom and/or across the front of the headrest cover to permit the headrest surface to deform to the contour of, and to properly support, the occupant's head and neck. A contact switch 850 is placed just inside cover 810 and functions as described above.

Instead of channels, the properties of the foam can be selected to provide the desired flow of gas, e.g, the design, shape, positioning and construction of the foam can be controlled and determined during manufacture to obtain the desired flow properties.

Figure 9A:
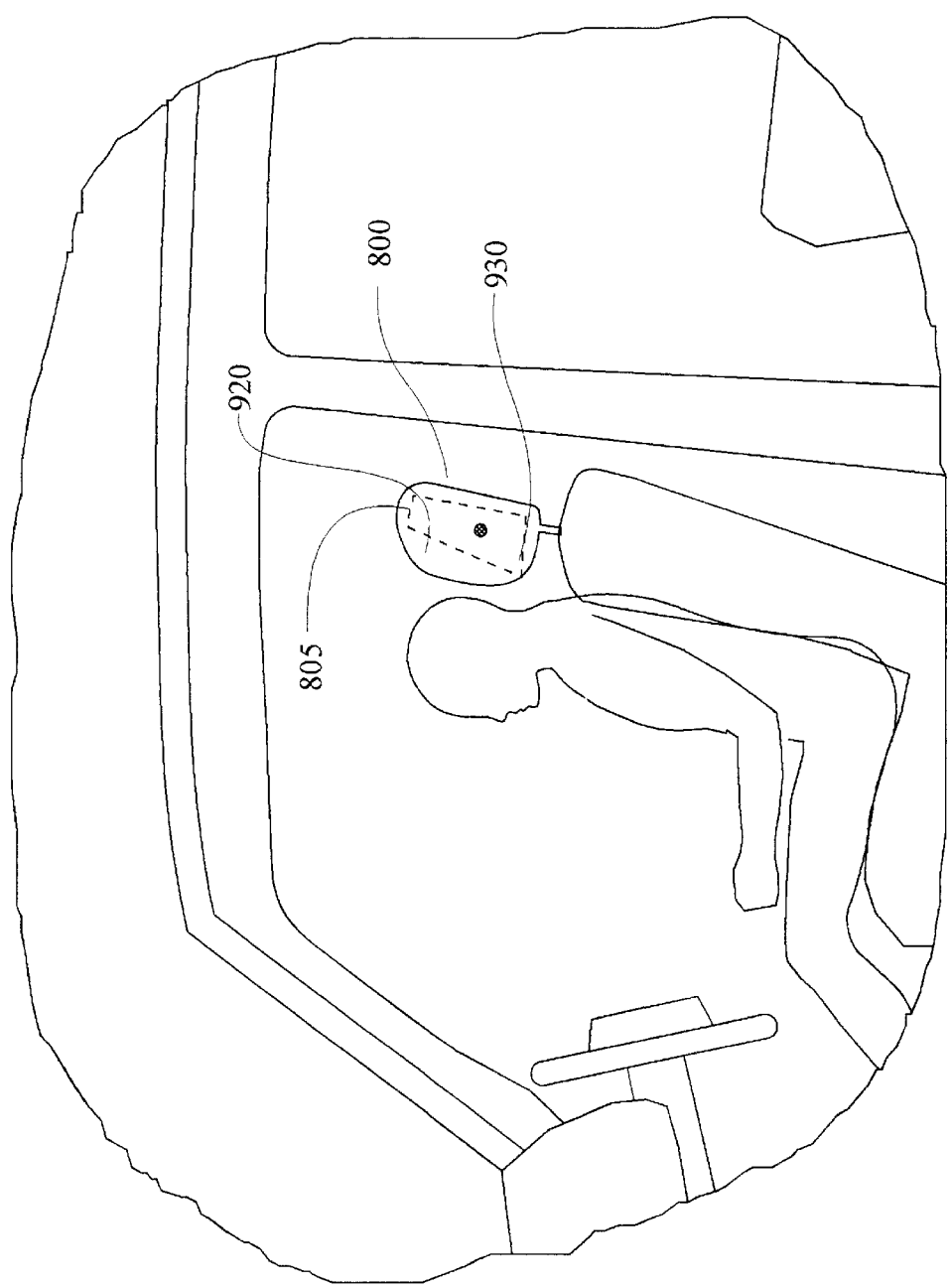
FIG. 9A is a side view of an occupant seated in the driver seat of an automobile with the headrest in the normal position.

FIG. 9A and FIG. 9B illustrate the operation of the headrest 800. In anticipation of a rear impact (or any other type of impact), as determined by the proximity sensors described above or any other anticipatory crash sensor system, headrest 800 is moved from its position as shown in FIG. 9A to its position as shown in FIG. 9B. This movement is enabled by control of the displacement means, such as those described above with reference to FIG. 3, as effected through the control module 250. The forward movement of the headrest 800 should continue until the headrest 800 contacts or impacts with the occupant's head as determined by a contact switch 850 When headrest 800 contacts or impacts the head 910 of the occupant 900, it exerts sufficient pressure against head 910 to cause air (the fluid in the bag 815 for the purposes of this explanation) to flow from the upper portion 920 to the lower portion 930 of headrest 800, which causes this lower portion to expand as the upper portion contracts. This initial flow of air takes place as the foam 840 compresses under the force of contact between the head and upper portion 920 of headrest 800. The initial shape of headrest 800 is created by the shape of the foam 840; however once the occupants head 910 begins to exert pressure on the upper portion 920 the air is compressed and begins to flow to the lower portion 930 causing it to expand until it contacts the neck 915 of the occupant 900. (If the occupant's head were to exert pressure on the lower portion 930 or once the pressure on the upper portion 920 were removed, air would flow from the lower portion 930 to the upper portion 920.) In this manner, by the flow of air, the pressure is equalized on the head and neck of the occupant 900 thereby preventing the whiplash type motions described in the Dellanno patents, as well as numerous technical papers on the subject The headrest of this invention acts very much like a pre-inflated airbag providing force where force is needed to counteract the accelerations of the occupant. It accomplishes this force balancing without the need to rotate a heavy object such as the headrest in the Dellanno patent which by itself could introduce injuries to the occupant.

In addition to use as a headrest, the structure described above can be used in other applications for cushioning an occupant of a vehicle, i.e., for cushioning another part of the occupant's body in an impact The cushioning arrangement would thus comprise a frame or support coupled to the vehicle and a fluid-containing bag attached to the frame or other support. A deformable cover would also be preferred. The bag, including the cell foam and vent hole as described above, would allow movement of the fluid within the bag to thereby alter the shape of the bag, upon contact with the part of the occupant's body, and enable the bag to conform to the part of the occupant's body. This would effectively cushion the occupant's body during an impact. Further, the cushioning arrangement could be coupled to the anticipatory crash sensor through a control unit (i.e., control module 250) and displacement means in a similar manner as headrest 800, to thereby enable movement of the cushioning arrangement against the part of the occupant's body just prior to or coincident with the crash.

A headrest using a pre-inflated airbag type structure composed of many small airbags is disclosed in FIG. 9 of U.S. Pat. No. 5,098,124 to Breed et al. which is incorporated herein by reference. The headrest disclosed here differs primarily through the use of a single pre-inflated fluid-containing bag, fluid-filled bag or airbag which when impacted by the head of the occupant, deforms by displacing the surface of the headrest outwardly to capture and support the neck of the occupant. The use of an airbag to prevent whiplash injuries is common for accidents involving frontal impacts and driver and passenger side airbags. Whiplash injuries have not become an issue in frontal impacts involving airbags; therefore, the ability of airbags to prevent whiplash injuries in frontal impacts is proven The use of airbags to prevent whiplash injuries in rear impacts is therefore appropriate and, if a pre-inflated airbag as described herein is used, results in a simple low-cost and effective headrest design. Naturally, other airbag designs are possible although the pre-inflated design as described herein is preferred This pre-inflated airbag headrest has another feature which further improves its performance. The vent hole 844 is provided to permit some of the air in the headrest to escape in a controlled manner thereby dampening the motion of the head and neck much in the same way that a driver side airbag has vent holes to dissipate the energy of the impacting driver during a crash. Appropriate regulation means may also be associated with the vent hole 844 of the headrest 800 to regulate the escaping air. Without the vent hole, there is risk that the occupant's head and neck will rebound off of the headrest, as is also a problem in the Dellanno patents. This can happen especially when, due to pre-crash braking or an initial frontal impact such as occurs in a multiple car accident, the occupant is sufficiently out of position that the headrest cannot reach his or her head before the rear impact Without this feature the acceleration on the head will necessarily be greater and therefore the opportunity for injury to the neck is increased. The size of this hole is determined experimentally or by mathematical analysis and computer simulation. If it is too large, too much air will escape and the headrest will bottom out on the support. If it is too small, the head will rebound off of the headrest thereby increasing the chance of whiplash injury. Naturally, a region of controlled porosity could be substituted for hole 844.

Finally, a side benefit of this invention is that it can be used to determine the presence of an occupant on the front passenger seat. This information can then be used to suppress deployment of an airbag if the seat is unoccupied.

Figure 10B:
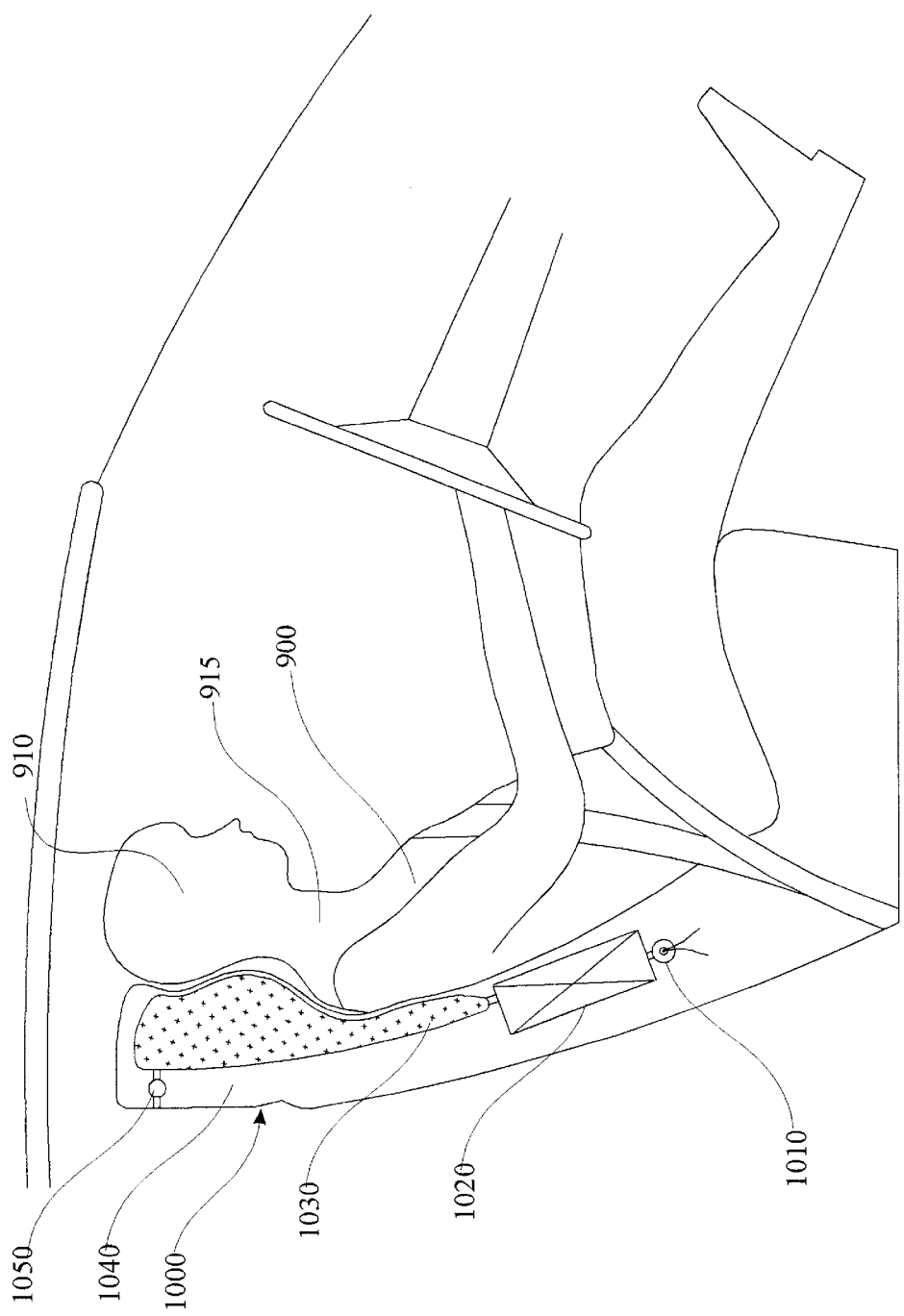
FIG. 10B is a view as in FIG. 10A with the bladder expanded in the head contact position as would happen in anticipation of, e.g., a rear crash.

FIG. 10A is a side view of an occupant seated in the driver seat of an automobile having an integral seat and headrest and an inflatable pressure controlled bladder with the bladder in the normal, uninflated condition. FIG. 10B is a view as in FIG. 10A with the bladder expanded in the head contact position as would happen in anticipation of, e.g, a rear crash.

The seat containing the bladder system of this embodiment of the invention is shown generally at 1000. The seat 1000 contains an integral bladder 1030 arranged within the cover of the seat 1000, a fluid-containing chamber 1020 connected to the bladder 1030 and a small igniter assembly 1010, which contains a small amount, such as about 5 grams, of a propellant such as barium potassium nitrate. Upon receiving a signal that a crash is imminent, igniter assembly 1010 is ignited and supplies a small quantity of hot propellant gas into chamber 1020. The gas (the fluid in a preferred embodiment) in chamber 1020 then expands due to the introduction of the high temperature gas and causes the bladder 1030 to expand to the condition shown in FIG. 10B. Bladder 1030 expands in such a manner (through its design, construction and/or positioning and/or through the design and construction of the seat 1000) as to conform to the shape of the occupant's head 910 and neck 915. As soon as the expanding headrest portion 1040 of the seat 1000 contacts the head 910 and neck 915 of the occupant (as may be determined by a contact sensor in the seat 1000), pressure begins to increase in the bladder 1030 causing a control valve 1050 to open and release gas into the passenger compartment to thereby prevent the occupant from being displaced toward the front of the vehicle Control valve 1050 is situated in a flow line between the bladder 1030 and an opening in the rear of the seat 1000 in the illustrated embodiment, but may be directly connected to the bladder 1030. The flow line may be directed to another location, e.g., the exterior of the vehicle, through appropriate conduits. Control valve 1050 can be controlled by appropriate control means, such as the central diagnostic module, and the amount of gas released coordinated with or based on the severity of the crash or any other parameter of the crash or deployment of the airbag.

In the examples of FIGS. 10A and 10B, a small pyrotechnic element is utilized as the igniter assembly 1010; however, the system itself is automatically resetable Thus, after the impact, the system returns to its pre-inflated position and the only part that needs to be replaced is the igniter assembly 1010. The cost of restoring the system after an accident is therefore small. The igniter assembly 1010 may be positioned so that it can be readily accessed from the rear of the seat, e.g., by removing a panel in the rear of the seat. The igniter assembly 1010 may be coupled directly or indirectly to a crash sensor, possibly through a central diagnostic module of the vehicle. The crash sensor is preferably an anticipatory crash sensor arranged so as to detect rear impacts because whiplash injuries are mostly caused during rear impacts.

In operation, the crash sensor detects the impending crash into the rear of the vehicle and generates a signal or causes a signal to be generated indicative of the fact that the igniter assembly 1010 should be activated to inflate the bladder 1030. The igniter assembly 1010 is then activated generating heated gas which is directed into chamber 1020. The gas in chamber 1020 expands and passes through one or more conduits into the bladder 1030 causing the bladder 1030 to expand to the condition shown in FIG. 10B. The expanding bladder 1030 will fill in the space between the occupant and the headrest and seat as shown in FIG. 10B. The bladder 1030 may be designed to have more expansion capability in the head and neck areas as those surfaces will initially be further from the body of the driver. The inflated bladder 1030 will thus reduce the risk of whiplash injuries to the driver.

The control valve 1050 is designed or controlled to ensure that the bladder 1030 expands sufficiently to provide whiplash protection without exerting a forward force of the driver. For example, the pressure in the bladder 1030 may be measured during inflation and once it reaches an optimum level, the control (or pressure release) valve 1050 may be activated. In the alternative, during the design phase, the time it takes for the bladder 1030 to inflate to the optimum level may be computed and then the control valve 1050 designed to activated after this predetermined time.

Instead of a control valve, it is also possible to use a variable outflow port or vent as described in the current assignee's U.S. Pat. No. 5,748,473, incorporated by reference herein.

After inflation and the crash, the igniter assembly 1010 can be removed and replaced with compatible igniter assembly so that the vehicle is ready for subsequent use.

As shown in FIGS. 10A and 10B, the bladder 1030 is integral with the seat 1000 and the headrest of the seat is formed with the backrest as a combined seat back portion. If the headrest is formed separate from the backrest, then the bladder 1030 can be formed integral with the headrest and if necessary, integral with the backrest to achieve the whiplash protection sought by the invention.

Figure 11A:
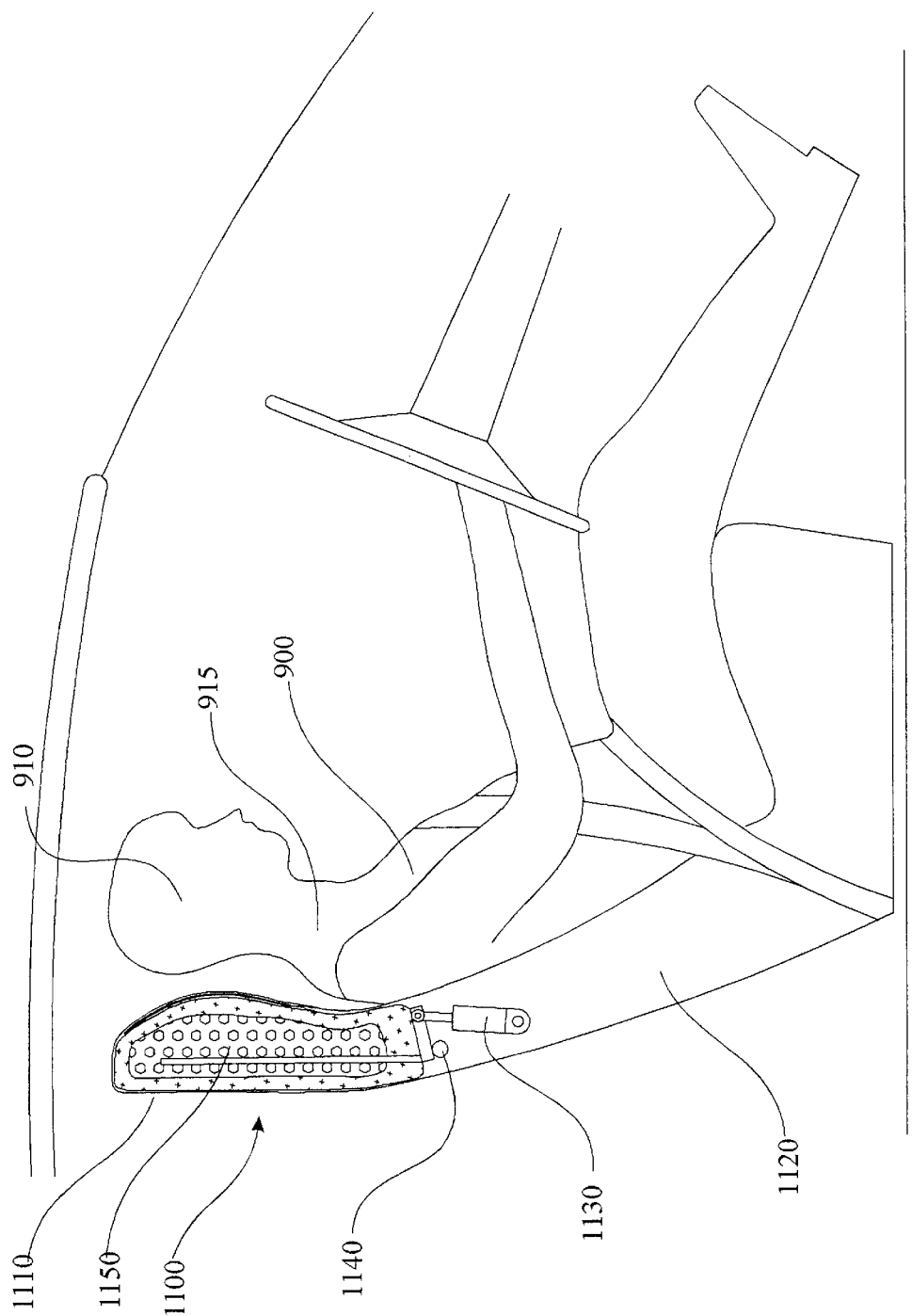
FIG. 11A is a side view of an occupant seated in the driver seat of an automobile having an integral seat and a pivotable headrest and bladder with the headrest in the normal position.
Figure 11B:
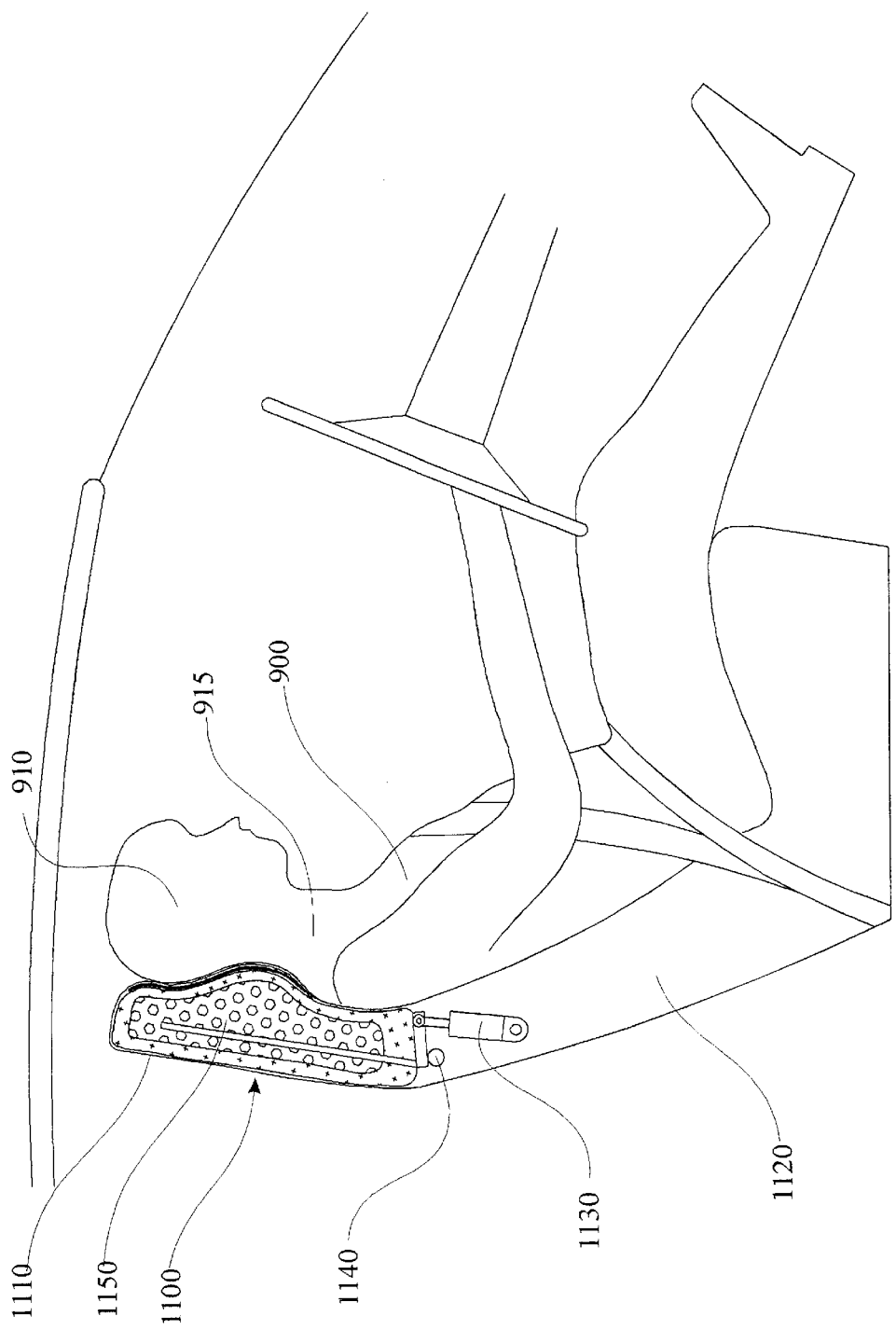
FIG. 11B is a view as in FIG. 11A with the headrest pivoted in the head contact position as would happen in anticipation of, e.g., a rear crash.

FIG. 11A is a side view of an occupant seated in the driver seat of an automobile having an integral seat and a pivotable or rotatable headrest and bladder with the headrest in the normal position. FIG. 11B is a view as in FIG. 11A with the headrest pivoted in the head contact position as would happen in anticipation of, e.g., a rear crash. in contrast to the embodiment of FIGS. 10A and 10B, this embodiment is purely passive in that no pyrotechnics are used.

In this embodiment, upon receiving a signal that a crash is imminent, electronic circuitry 1115 activates solenoid 1130 causing headrest portion 1110 to rotate about pivot 1140 (an axis, pin, etc) toward the occupant. The system is shown generally at 1100 and comprises a seat back portion 1120 and headrest portion 1110. In FIG. 11B, the headrest portion 1110 has rotated until it contacts the occupant and then a bladder or airbag 1150 within headrest portion 1110 changes shape or deforms to conform to the head 910 and neck 915 of the occupant thereby supporting both the head and neck and preventing a whiplash injury. The control of the rotation of the headrest portion 1110 can be accomplished either by a contact switch or force measurement using a switch or force sensor in the headrest or a force or torque sensor at the solenoid 1130 or, alternately, by measuring the pressure within the airbag 1150. Solenoid 1130 can be replaced by another linear actuator such as an air cylinder with an appropriate source of air pressure.

The electronic circuitry 1115 may be controlled by the central diagnostic module or upon receiving a signal from the crash sensor Airbag 1150 is shown arranged within the headrest portion 1110, i.e., it is within the periphery of the surface layer of the headrest portion 1110 and seat 1100.

In operation, the crash sensor detects the impending crash, e.g., into the rear of the vehicle, and generates a signal or causes a signal to be generated resulting in pivotal movement of the headrest portion 1110. The headrest portion 1110 is moved (pivoted) preferably until a point at which the front of the headrest portion 1110 touches the back of the driver's head. This can all occurs prior to the actual crash. Thereafter, upon the crash, the driver will be forced backwards against the pivoted headrest portion 1110. Gas will flow from the upper part of the headrest portion 1110 and the seat back and thereby distribute the load between the head, neck and body.

As shown in FIGS. 11A and 11B, the headrest portion of the seat is formed with the backrest as a combined seat back portion. If the headrest is formed separate from the backrest, then the airbag 1150 can be formed integral with the headrest and if necessary, integral with the backrest to achieve the whiplash protection sought by the invention. In this case, the pivot 1140 might be formed in the backrest or between the backrest and headrest.

Although shown for use with a driver, the same systems could be used for passengers in the vehicle as well, i.e., it could be used for the front-seat passenger(s) and any rear-seated passengers. Also, although whiplash injuries are most problematic in rear impacts, the same system could be used for side impacts as well as front impacts and rollovers with varying degrees of usefulness.

Thus, disclosed herein is a seat for a vehicle for protecting an occupant of the seat in a crash which comprises a headrest portion, an expandable bladder arranged at least partially in the headrest portion, the bladder being arranged to conform to the shape of a neck and head of the occupant upon expansion, and an igniter for causing expansion of the bladder upon receiving a signal that protection for the occupant is desired. The bladder may also be arranged in least partially in the backrest portion of the seat. A fluid-containing chamber is coupled to the igniter and in flow communication with the bladder whereby the igniter causes fluid in the chamber to expand and flow into the bladder to expand the bladder. A control valve is associated with the bladder for enabling the release of fluid from the bladder. The bladder is preferably arranged in an interior of the headrest portion, i.e., such that its expansion is wholly within the outer surface layer of the headrest portion of the seat A vehicle including this system can also include a crash sensor system for determining that a crash requiring protection for the occupant is desired. The crash sensor system generates a signal and directing the signal to the igniter. The crash sensor system may be arranged to detect a rear impact.

Another seat for a vehicle for protecting an occupant of the seat in a crash disclosed above comprises a backrest including a backrest portion and a headrest portion and an airbag arranged at least partially in the headrest portion. The headrest portion is pivotable with respect to the backrest portion toward the occupant. To this end, pivot means are provide for enabling pivotal movement of the headrest portion relative to the backrest portion. The pivot means may be a solenoid arranged to move an arm about a pivot axis, which arm is coupled to the headrest portion. The airbag is arranged in an interior of the headrest portion of the backrest. A vehicle including this system can also include a crash sensor system for determining that a crash requiring protection for the occupant is desired. The headrest portion is pivoted into contact with the occupant upon a determination by the crash sensor system that a crash requiring protection for the occupant is desired. The crash sensor system may be arranged to detect a rear impact.

Thus there is disclosed and illustrated herein a passive rear impact protection system which requires no action by the occupant and yet protects the occupant from whiplash injuries caused by rear impacts. Although several preferred embodiments are illustrated and described above there are possible combinations using other geometry, material, and different dimensions of the components that can perform the same function. Therefore, this invention is not limited to the above embodiments and should be determine by the following claims In particular, although the particular rear impact occupant protection system described in detail above requires all of the improvements described herein to meet the goals and objectives of this invention, some of these improvements may not be used in some applications.

Also disclosed herein is a headrest for a seat which comprises a frame attachable to the seat and a fluid-containing bag attached to the frame. The bag is structured and arranged to allow movement of the fluid within the bag to thereby alter the shape of the bag and enable the bag to conform to the head and neck of an occupant. A deformable cover may substantially surround the bag such that the bag is within the seat, i.e., an outer surface of the bag is not exposed to the atmosphere. The cover is elastically deformable in response to changes in pressure in the bag. The frame may be made of a rigid material. The bag can contain cell foam having openings (open cell foam), which in a static state, determines the shape of the bag. The fluid in the bag may be air, i e., an airbag. To provide the elastic deformation of the cover, the cover may include stretch seams at one or more locations. Preferably, the stretch seams should be placed on the side(s) of the headrest which will contour to the shape of the occupant's head and neck upon impact. The bag may include constraining means for constraining flow of fluid from an upper portion of the headrest to a lower portion of the headrest. Such constraining means may comprise open cell foam possibly with channels extending in a direction from a top of the headrest to a bottom of the headrest. In the alternative, the properties of the foam may be controlled to get the desired flow rate and possibly flow direction. The constraining means are structured and arranged such that when the upper portion contracts, the lower portion expands. Also, the constraining means may be designed so that when the upper portion expands, the lower portion contracts. The cover and bag are structured and arranged such that when an occupant impacts the headrest, fluid within the bag flows substantially within the bag to change the shape of the bag so as to approximately conform to the head and neck of the occupant thereby providing a force on the head and neck of the occupant to substantially accelerate both the head and neck at substantially the same acceleration in order to minimize whiplash injuries. The bag preferably includes a flow restriction which permits a controlled flow of fluid out of the bag upon impact of an object with the headrest to thereby dampen the impact of the object with the headrest.

An inventive seat comprises a seat frame, a bottom cushion, a back cushion cooperating to support an occupant and a headrest attached to the seat frame. The headrest is as in any of the embodiments described immediately above.

An inventive cushioning arrangement for protecting an occupant in a crash comprises a frame coupled to the vehicle and a fluid-containing bag attached to the frame. The bag is structured and arranged to allow movement of the fluid within the bag to thereby alter the shape of the bag and enable the bag to conform to a portion of the occupant engaging the cushioning arrangement. The cushioning arrangement should be arranged relative to the occupant such that the bag impacts the occupant during the crash. As used here (and often elsewhere in this application), "impact" does not necessarily imply direct contact between the occupant and the bag but rather may be considered the exertion of pressure against the bag caused by contact of the occupant with the outer surface of the cushioning arrangement which is transmitted to the bag. The cushioning arrangement can also include a deformable cover substantially surrounding the bag. The cover is elastically deformable in response to changes in pressure in the bag. The frame may be coupled to a seat of the vehicle and extends upward from a top of the seat such that the cushioning arrangement constitutes a headrest. In the alternative, the cushioning arrangement can be used anywhere in a vehicle in a position in which the occupant will potentially impact it during the crash The bag and headrest may be as in any of the embodiments described above.

An inventive protection system for protecting an occupant in a crash comprises an anticipatory crash sensor for determining that a crash involving the vehicle is about to occur, and a movable cushioning arrangement coupled to the anticipatory crash sensor. The cushioning arrangement is movable toward a likely position of the occupant, preferably in actual contact with the occupant, upon a determination by the anticipatory crash sensor that a crash involving the vehicle is about to occur. The cushioning arrangement comprises a frame coupled to the vehicle, and a fluid-containing bag attached to the frame. The bag is structured and arranged to allow movement of the fluid within the bag to thereby alter the shape of the bag and enable the bag to conform to the occupant. The cushioning arrangement and its parts may be as described in any of the embodiments above. The anticipatory crash sensor may be arranged to determine that the crash involving the vehicle is a rear impact. In this case, it could comprise a transmitter/receiver arrangement mounted at the rear of the vehicle. To provide for movement of the cushioning arrangement, a displacement mechanism is provided, e.g., a system of servo-motors, screws and support rods, and a control unit is coupled to the anticipatory crash sensor and the displacement mechanism. The control unit controls the displacement mechanism to move the cushioning arrangement based on the determination by the anticipatory crash sensor that a crash involving the vehicle is about to occur.

One disclosed method for protecting an occupant in an impact comprises the steps of determining that a crash involving the vehicle is about to occur, and moving a cushioning arrangement into contact with the occupant upon a determination that a crash involving the vehicle is about to occur. The cushioning arrangement comprises a frame coupled to the vehicle and a fluid-containing bag attached directly or indirectly to the frame. The bag is structured and arranged to allow movement of the fluid within the bag to thereby alter the shape of the bag and enable the bag to conform to the occupant. The cushioning arrangement may be as in any of the embodiments described above. The step of moving the cushioning arrangement into contact with the occupant may comprise the steps of moving the cushioning arrangement toward the occupant, detecting when the cushioning arrangement comes into contact with the occupant and then ceasing movement of the cushioning arrangement. The step of detecting when the cushioning arrangement comes into contact with the occupant may comprise the step of arranging a contact switch in connection with the cushioning arrangement.

Also disclosed herein is a headrest and headrest positioning system which reduce whiplash injuries from rear impacts by properly positioning the headrest behind the occupant's head either continuously, or just prior to and in anticipation of, the vehicle impact and then properly supports both the head and neck. Sensors determine the location of the occupant's head and motors move the headrest both up and down and forward and back as needed. In one implementation, the headrest is continuously adjusted to maintain a proper orientation of the headrest to the rear of the occupant's head. In another implementation, an anticipatory crash sensor, such as described in U S. patent application Ser. No. 09/307,883, is used to predict that a rear impact is about to occur, in which event, the headrest is moved proximate to the occupant.

Also disclosed herein is an apparatus for determining the location of the head of the occupant in the presence of objects which obscure the head. Such an apparatus comprises transmitter means for illuminating a selective portion of the occupant and the head-obscuring objects in the vicinity of the head, sensor means for receiving illumination reflected from or modified by the occupant and the head-obscuring objects and generating a signal representative of the distance from the sensor means to the illuminated portion of the occupant and the head-obscuring objects, selective portion changing means for changing the illuminated portion of the occupant and the head-obscuring objects which is illuminated by the transmitter means and a processor. The processor comprises means for sequentially operating the selective portion changing means so as to illuminate different portions of the occupant and the head-obscuring objects, and pattern recognition means for determining the location of the head from the signals representative of the distance from the sensor means to the different selective portions of the occupant and the head-obscuring objects The pattern recognition means may comprise a neural network. In some embodiments of the invention, the head-obscuring objects comprise items from the class containing clothing and hair. The pattern recognition means may be arranged to determine the location of the approximate longitudinal location of the head from the headrest. If one or more airbags is mounted within the vehicle, the head location system may include means for determining the location of the head relative to the airbag. The transmitter means may comprise an ultrasonic transmitter arranged in the headrest and the sensor means may also be arranged in the headrest, possibly vertically spaced from the transmitter means. In the alternative, the transmitter means and sensor means may comprise a single transducer. The selective portion changing means may comprise a control module coupled to the transmitter means and the sensor means and servomotors for adjusting the position of the headrest.

Illumination as used herein is any form of radiation which is introduced into a volume of which contains the head of an occupant and includes, but it is not limited to, electromagnetic radiation from below one kHz to above ultraviolet optical radiation ($10^{16}$ Hz) and ultrasonic radiation. Thus, any system, such as a capacitive system, which uses a varying electromagnetic field, or equivalently electromagnetic waves, is meant to be included by the term illumination as used herein. By reflected radiation, it is meant the radiation that is sensed by the device that comes from the volume occupied by the head, or other part, of an occupant and indicates the presence of that part of the occupant. Examples of such systems are ultrasonic transmitters and receivers placed in the headrest of the vehicle seat, capacitive sensors placed in the headrest or other appropriate location (or a combination of locations such as one plate of the capacitor being placed in the vehicle seat and the other in the headliner), radar, far or near frequency infrared, visible light, ultraviolet, etc.

While the invention has been illustrated and described in detail in the drawings and the foregoing description, the same is to be considered as illustrative and not restrictive in character, it being understood that only the preferred embodiments have been shown and described and that all changes and modifications that come within the spirit of the invention are desired to be protected.

What is claimed is:

1. A vehicle, comprising:
   a seat including a movable headrest against which an occupant can rest his or her head;
   an anticipatory crash sensor arranged to detect an impending crash involving the vehicle based on data obtained prior to the crash; and
   a movement mechanism coupled to said crash sensor and said headrest and arranged to move said headrest or a part of said headrest upon detection of an impending crash involving the vehicle by said crash sensor.

2. The vehicle of claim 1, wherein said crash sensor is arranged to produce an output signal when an object external from the vehicle is approaching the vehicle at a velocity above a design threshold velocity.

3. The vehicle of claim 1, wherein said movement mechanism is arranged to move said headrest or the part of said headrest from an initial position to a position more proximate to the head of the occupant.

4. The vehicle of claim 1, further comprising a determining system for determining the location of the head of the occupant, said movement mechanism being arranged to move said headrest or the part of said headrest from an initial position to a position more proximate to the determined location of the head of the occupant.

5. The vehicle of claim 4, wherein said determining system includes a wave-receiving sensor arranged to receive waves from a direction of the head of the occupant.

6. The vehicle of claim 4, wherein said determining system comprises
   transmitter means for transmitting radiation to illuminate different portions of the head of the occupant;
   receiver means for receiving a first set of signals representative of radiation reflected from the different portions of the head of the occupant, said receiver means providing a second set of signals representative of the distances from said headrest to the nearest illuminated portion the head of the occupant; and
   a processor comprising computational means to determine the headrest vertical location corresponding to the nearest part of the head to said headrest from said second set of signals from said receiver means.

7. The vehicle of claim 6, wherein said transmitter means and said receiver means are arranged in said headrest.

8. The vehicle of claim 4, wherein said determining system comprises a sensor selected from a group consisting of an electric field sensor, a capacitance sensor, a radar sensor, an optical sensor, a camera, a three-dimensional camera, a passive infrared sensor, an ultrasound sensor, a stereo sensor, a focusing sensor and a scanning system.

9. The vehicle of claim 1, further comprising a processor coupled to said crash sensor and said movement mechanism and arranged to determine the motion required of said headrest to place said headrest proximate to the head, said processor means providing the motion determination to said movement mechanism upon detection of an impending crash involving the vehicle by said crash sensor.

10. The vehicle of claim 9, further comprising a system for determining the location of the head of the occupant relative to said headrest, said determining system being coupled to said processor.

11. The vehicle of claim 1, wherein said crash sensor comprises an ultrasonic sensor.

12. The vehicle of claim 1, wherein said crash sensor comprises an electromagnetic wave sensor.

13. The vehicle of claim 1, wherein said crash sensor comprises measuring means for determining the distance from the vehicle to an external object whereby the velocity of the external object is calculatable from successive distance measurements.

14. The vehicle of claim 13, wherein said measuring means comprise means for measuring time of flight of a pulse.

15. The vehicle of claim 13, wherein said measuring means comprise means for measuring a phase change.

16. The vehicle of claim 13, wherein said measuring means comprise means for measuring a Doppler radar pulse.

17. The vehicle of claim 13, wherein said measuring means comprise means for performing range gating of an ultrasonic pulse, an optical pulse or a radar pulse.

18. The vehicle of claim 1, wherein said crash sensor comprises an ultrasonic transmitter and two ultrasonic receivers.

19. The vehicle of claim 1, wherein said crash sensor comprises pattern recognition means for recognizing, identifying or ascertaining the identity of external objects.

20. The vehicle of claim 19, wherein said pattern recognition means comprises a neural network.

21. The vehicle of claim 1, wherein said crash sensor comprises a radar sensor.

22. The vehicle of claim 1, wherein said crash sensor comprises a noise radar sensor.

23. The vehicle of claim 1, wherein said crash sensor comprises a camera.

24. The vehicle of claim 1, wherein said crash sensor comprises a scanning laser radar.

25. The vehicle of claim 1, wherein said crash sensor comprises a passive infrared sensor.

26. The vehicle of claim 1, further comprising at least one sensor arranged within said headrest for determining that the head is in contact with said headrest, said movement mechanism moving said headrest or the part of said headrest to a contacting position with the head when said crash sensor detects an impending cash involving the vehicle.

27. The vehicle of claim 1, wherein said crash sensor is arranged at a rear of the vehicle to detect a rear impact.

28. A vehicle, comprising:
   a seat including a movable headrest against which an occupant can rest his or her head;
   anticipatory crash sensor means for detecting an impending crash involving the vehicle based on data obtained prior to the crash; and
   movement means coupled to said crash sensor and said headrest for moving said headrest or a part of said headrest upon detection of an impending crash involving the vehicle by said crash sensor means.

29. The vehicle of claim 28, wherein said crash sensor means is arranged to produce an output signal when an object external from the vehicle is approaching the vehicle at a velocity above a design threshold velocity.

30. The vehicle of claim 28, wherein said movement means is arranged to move said headrest or the part of said headrest from an initial position to a position more proximate to the head of the occupant.

31. The vehicle of claim 28, further comprising determining means for determining the location of the head of the occupant relative to said headrest, said movement means being arranged to move said headrest or the part of said headrest from an initial position to a position more proximate to the determined location of the head of the occupant.

32. The vehicle of claim 31, wherein said determining system includes a wave-receiving sensor arranged to receive waves from a direction of the head of the occupant.

33. The vehicle of claim 31, wherein said determining means comprise
   transmitter means for transmitting radiation to illuminate different portions of the head of the occupant;
   receiver means for receiving a first set of signals representative of radiation reflected from the different portions of the head of the occupant, said receiver means providing a second set of signals representative of the distances from said headrest to the nearest illuminated portion the head of the occupant; and
   a processor arranged to determine the headrest vertical location corresponding to the nearest part of the head to said headrest from said second set of signals from said receiver means.

34. The vehicle of claim 33, wherein said transmitter means and said receiver means are arranged in said headrest.

35. The vehicle of claim 31, wherein said determining system comprises a sensor selected from a group consisting of an electric field sensor, a capacitance sensor, a radar sensor, an optical sensor, a camera, a three-dimensional camera, a passive infrared sensor, an ultrasound sensor, a stereo sensor, a focusing sensor and a scanning system.

36. The vehicle of claim 28, further comprising a processor coupled to said crash sensor means and said movement means for determining motion required of said headrest or the part of said headrest to place said headrest or the part of said headrest proximate to the head, said processor providing the motion determination to said movement means upon detection of an impending crash involving the vehicle by said crash sensor means.

37. The vehicle of claim 36, further comprising determining means for determining the location of the head of the occupant relative to said headrest, said determining means being coupled to said processor.

38. The vehicle of claim 28, wherein said crash sensor means comprise an ultrasonic sensor.

39. The vehicle of claim 28, wherein said crash sensor means comprise an electromagnetic wave transducer.

40. The vehicle of claim 28, wherein said crash sensor means are arranged to determine the distance from the vehicle to an external object whereby the velocity of the external object is calculatable from successive distance measurements.

41. The vehicle of claim 40, wherein said crash sensor means comprise means for measuring time of flight of a pulse.

42. The vehicle of claim 40, wherein said crash sensor means comprise means for measuring a phase change.

43. The vehicle of claim 40, wherein said crash sensor means comprise means for measuring a Doppler radar pulse.

44. The vehicle of claim 40, wherein said crash sensor means comprise means for performing range gating of an ultrasonic pulse, an optical pulse or a radar pulse.

45. The vehicle of claim 28, wherein said crash sensor means comprise an ultrasonic transmitter and two ultrasonic receivers.

46. The vehicle of claim 28, wherein said crash sensor means comprise pattern recognition means for recognizing, identifying or ascertaining the identity of external objects.

47. The vehicle of claim 46, wherein said pattern recognition means comprises a neural network.

48. The vehicle of claim 28, further comprising at least one sensor arranged within said headrest for determining that the head is in contact with said headrest, said movement means moving said headrest or the part of said headrest to a contacting position with the head when said crash sensor means detect an impending cash involving the vehicle.

49. The vehicle of claim 28, wherein said crash sensor means is arranged at a rear of the vehicle to detect a rear impact.

50. A method for protecting an occupant of a vehicle during a crash, comprising the steps of:
   detecting an impending crash involving the vehicle based on data obtained prior to the crash; and
   moving a headrest or a part of a headrest upon the detection of an impending crash involving the vehicle to a position more proximate to the occupant.

51. The method of claim 50, wherein the step of detecting an impending crash comprises the step of determining the velocity of an external object approaching the vehicle and producing a crash signal when the object is approaching the vehicle at a velocity above a design threshold velocity.

52. The method of claim 50, further comprising the step of determining the location of the head of the occupant, the step of moving the headrest or the part of the headrest comprising the step of moving the headrest or the part of the headrest from an initial position to the position more proximate to the determined location of the head of the occupant.

53. The method of claim 52, wherein the step of determining the location of the head of the occupant comprises the steps of transmitting radiation to illuminate different portions of the head of the occupant, receiving at the headrest a first set of signals representative of radiation reflected from different portions of the head of the occupant, providing a second set of signals representative of the distances from the headrest to the nearest illuminated portion the head of the occupant, and determining the headrest vertical location corresponding to the nearest part of the head to the headrest from the second set of signals.

54. The method of claim 50, wherein the step of detecting an impending crash involving the vehicle comprises the step of transmitting waves outward from the vehicle, receiving returned waves and calculating the distance between the vehicle and external objects based on the difference between the transmitted and returned waves.

55. The method of claim 50, wherein the step of detecting an impending crash involving the vehicle comprises the step of determining the distance from the vehicle to an external object and the velocity of the external object from successive distance measurements.

56. The method of claim 55, wherein the distance is determined by measuring time of flight of a pulse.

57. The method of claim 55, wherein the distance is determined by measuring a phase change.

58. The method of claim 55, wherein the distance is determined by measuring a Doppler radar pulse.

59. The method of claim 55, wherein the distance is determined by range gating an ultrasonic pulse, an optical pulse or a radar pulse.

60. The method of claim 50, further comprising the step of recognizing, identifying or ascertaining the identity of external objects.

61. The method of claim 50, wherein the step of detecting an impending crash involving the vehicle comprises the step of arranging a crash sensor at a rear of the vehicle to detect a rear impact.

* * * * *